(12) United States Patent
Hayden, III

(10) Patent No.: US 8,979,016 B2
(45) Date of Patent: Mar. 17, 2015

(54) METHODS AND APPARATUS FOR VERTICAL SHORT TAKEOFF AND LANDING

(71) Applicant: Radeus Labs, Inc., Poway, CA (US)

(72) Inventor: Raymond Don Hayden, III, Poway, CA (US)

(73) Assignee: Radeus Labs, Inc., Poway, CA (US)

( * ) Notice: Subject to any disclaimer, the term of this patent is extended or adjusted under 35 U.S.C. 154(b) by 41 days.

(21) Appl. No.: 13/675,707

(22) Filed: Nov. 13, 2012

(65) Prior Publication Data

US 2013/0306802 A1 Nov. 21, 2013

Related U.S. Application Data

(60) Provisional application No. 61/560,667, filed on Nov. 16, 2011.

(51) Int. Cl.
| | |
|---|---|
| *B64C 29/00* | (2006.01) |
| *B64C 27/20* | (2006.01) |
| *B64C 39/02* | (2006.01) |

(52) U.S. Cl.
CPC .............. *B64C 29/00* (2013.01); *B64C 27/20* (2013.01); *B64C 39/024* (2013.01); *B64C 2201/027* (2013.01); *B64C 2201/108* (2013.01); *B64C 2201/127* (2013.01)
USPC .............. 244/23 C; 244/12.2; 244/17.23; 244/17.25; 244/17.11

(58) Field of Classification Search
USPC .............. 244/12.2, 17.11, 17.23, 17.25, 58
See application file for complete search history.

(56) References Cited

U.S. PATENT DOCUMENTS

| | | | | |
|---|---|---|---|---|
| 2,604,950 | A * | 7/1952 | Sipe ........................... | 416/132 R |
| 3,774,865 | A | 11/1973 | Pinto | |
| 3,997,131 | A * | 12/1976 | Kling ........................... | 244/23 R |
| 4,778,128 | A * | 10/1988 | Wright et al. ................ | 244/23 C |
| 5,072,892 | A * | 12/1991 | Carrington .................. | 244/23 C |
| 5,318,248 | A | 6/1994 | Zielonka | |
| 5,887,828 | A * | 3/1999 | Appa ............................ | 244/215 |
| 6,010,098 | A * | 1/2000 | Campanile et al. ........... | 244/219 |
| 6,293,492 | B1 * | 9/2001 | Yanagisawa ................. | 244/17.25 |
| 6,308,912 | B1 * | 10/2001 | Kirjavainen ................. | 244/12.2 |
| 6,398,159 | B1 * | 6/2002 | Di Stefano .................. | 244/17.11 |
| 6,450,446 | B1 * | 9/2002 | Holben ....................... | 244/34 A |
| 6,575,401 | B1 | 6/2003 | Carver | |
| 6,581,872 | B2 * | 6/2003 | Walmsley .................... | 244/12.2 |
| 7,604,198 | B2 * | 10/2009 | Petersen ..................... | 244/17.23 |
| 7,931,239 | B2 * | 4/2011 | Pedersen et al. ............. | 244/189 |
| 7,950,603 | B2 * | 5/2011 | Kissel, Jr. .................. | 244/17.19 |
| 8,167,234 | B1 * | 5/2012 | Moore ........................ | 244/17.25 |
| 8,256,719 | B2 * | 9/2012 | Wood et al. .................. | 244/200 |
| 8,464,978 | B2 * | 6/2013 | Yim et al. .................. | 244/17.23 |

(Continued)

OTHER PUBLICATIONS

Lin, J., Ren, F., Pearton S., and Chen, M. "Remove Wireless Power Transmission for Regenerative Fuel Cells," 2008, p. 1-16.

*Primary Examiner* — Christopher P Ellis
*Assistant Examiner* — Medhat Badawi
(74) *Attorney, Agent, or Firm* — Gazdzinski & Associates, PC

(57) ABSTRACT

Methods and apparatus for vertical or short takeoff and landing. In one embodiment, the apparatus comprises two or more counter driven rings with one or more airfoils attached. In one variant, there is an upper ring and a lower ring, each with multiple airfoils attached. In one variant, lift is generated largely via ambient air currents, allowing for long term on-station operation of the device.

17 Claims, 29 Drawing Sheets

(56) References Cited

U.S. PATENT DOCUMENTS

| | | |
|---|---|---|
| 2005/0067527 A1* | 3/2005 | Petersen .................. 244/17.11 |
| 2007/0215746 A1 | 9/2007 | Rieken et al. |
| 2008/0112808 A1 | 5/2008 | Schmaling et al. |
| 2009/0084891 A1* | 4/2009 | Darrow et al. ............. 244/17.19 |
| 2010/0187369 A1* | 7/2010 | Fleming ......................... 244/23 |
| 2010/0320333 A1* | 12/2010 | Martin ....................... 244/23 A |
| 2011/0163199 A1 | 7/2011 | Cardozo |
| 2012/0049009 A1* | 3/2012 | Kissel, Jr. ...................... 244/23 |

* cited by examiner

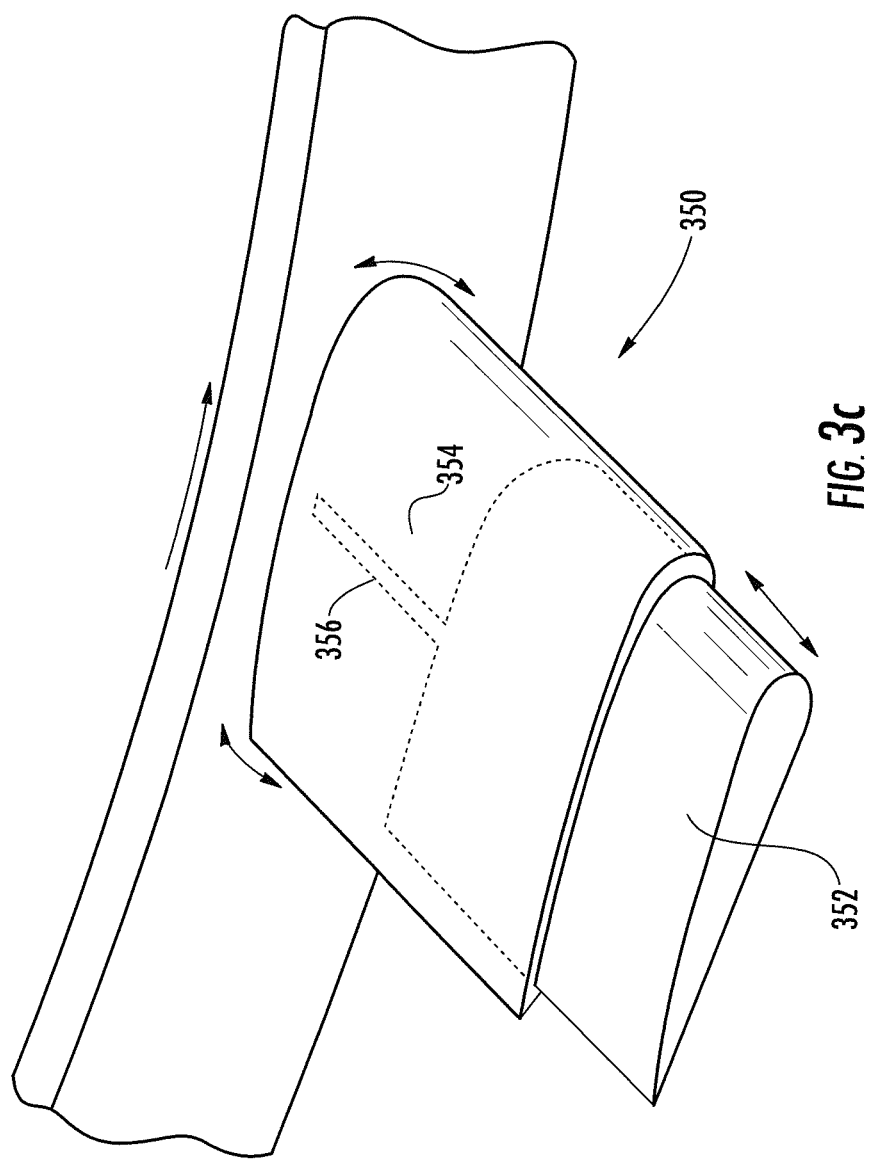

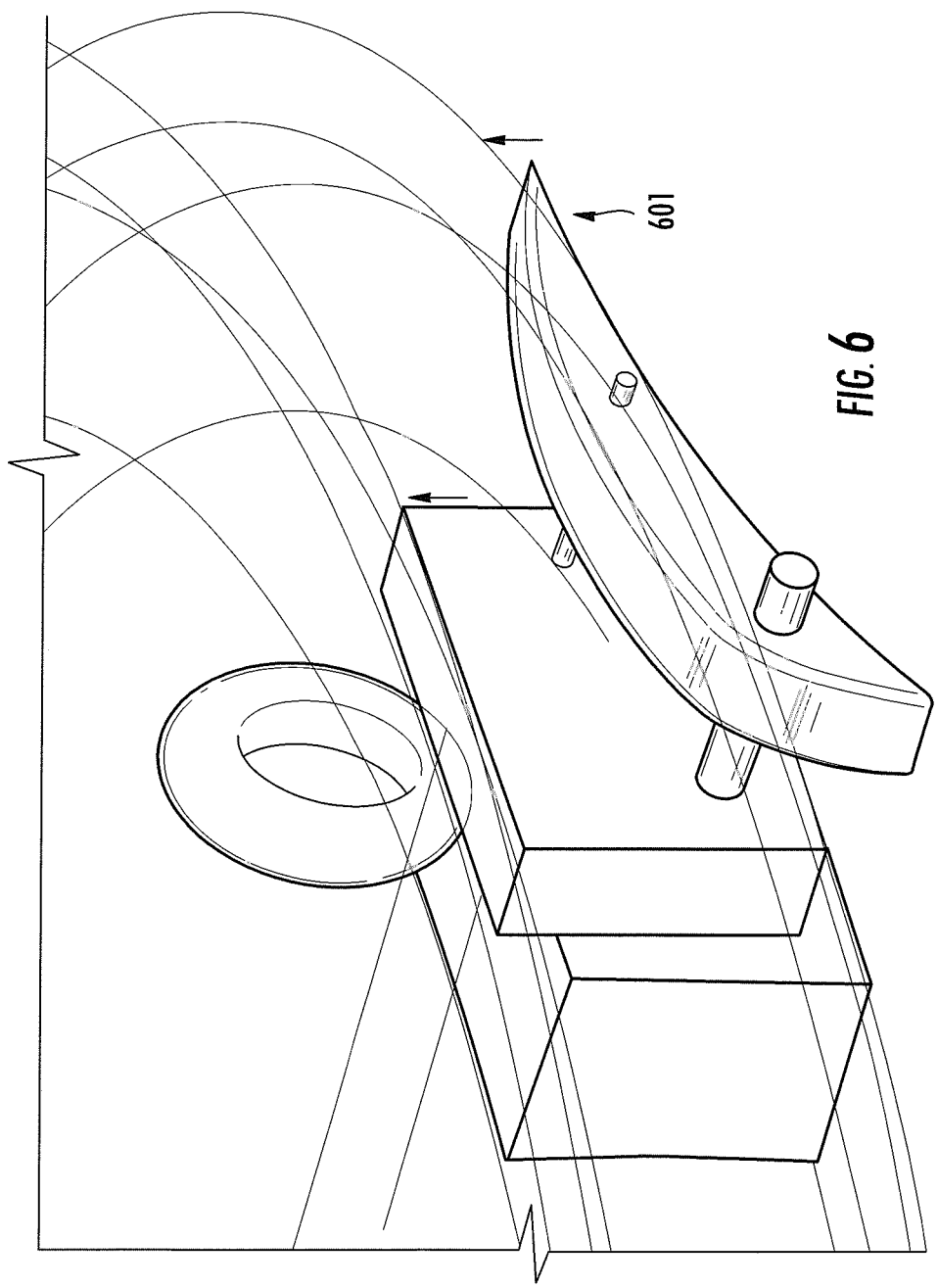

METHODS AND APPARATUS FOR VERTICAL SHORT TAKEOFF AND LANDING

PRIORITY

This application claims priority to U.S. Provisional Patent Application Ser. No. 61/560,667 filed Nov. 16, 2011 of the same title, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field

The present disclosure relates generally to the fields of aviation and aerospace engineering. More particularly, in one exemplary aspect, the present disclosure is directed to methods and apparatus for vertical short takeoff and landing.

2. Description of Related Technology

A wide range of aviation related applications require flexibility in aircraft movement. Common requirements are vertical or short takeoff, hovering capabilities, and frequent changes in flight vector, etc. Additionally, unmanned aircraft are in high demand for defense or other applications (such as drug surveillance or interdiction) in which deploying personnel is either too dangerous or impractical given the task requirements.

It is impossible to design aircraft that meet the needs of every aviation application. Therefore, having a wide variety aircraft designs utilizing a wide variety of flight systems (e.g. propulsion, takeoff, landing etc) is necessary to match the requirements of a multitude of tasks. However, given monetary constraints, there is a practical limit to the number of aircraft that can be manufactured and dedicated to any specific purpose or group. Therefore, it is important that selected designs offer the broadest task flexibility possible, while not overlapping unduly with aircraft already in widespread use.

Existing solutions for vertical short takeoff and landing (VSTOL) generally either comprise: (i) those driven by a main rotor stabilized via a tail rotor (e.g., helicopter), (ii) more traditional airplane driven by engines or turbines the can be placed in multiple orientations (e.g., V-22 Osprey or Harrier jets), or (iii) small craft dependent on one or more turbines (Multipurpose Security and Surveillance Mission Platform or SoloTrek Exo-Skeletor Flying Vehicle). While the more traditional plane designs offer high-top speeds, and increase mission range/duration via gliding capabilities, these systems are limited in the speed at which they can accommodate a significant change in flight vector. Thus, these vehicles would be inappropriate for e.g., low-altitude applications in an urban environment. Conversely, helicopters and smaller turbine based craft lack the capability to remain aloft without expending significant power or fuel resources to keep their turbines running. Moreover, all of these vehicles have a preferred orientation such that if they become inverted, the craft will have to be righted before lift capability can be restored.

Unfortunately, modern applications often require both flight through confined areas and long on-station dwell or long-range deployment of the aircraft. Moreover, vehicles used in such applications may often experience violent disruptions or turbulence in their immediate airspace. Thus, losing lift capability as a result of environmental conditions or an unexpected inversion is a significant operational limitation.

Accordingly, improved solutions are required for VSTOL. Such improved solutions should ideally be flexible enough for urban or other confined area navigation, be able to generate lift in multiple orientations, and have suitable on-station dwell and range operational capacity.

SUMMARY

The present disclosure satisfies the aforementioned needs by providing, inter alia, improved methods and apparatus for vertical short takeoff and landing.

In a first aspect of the disclosure, a vertical short takeoff and landing apparatus is disclosed. In one embodiment, the apparatus comprises multiple (e.g., two) contra-rotating rings with attached airfoils, a fuselage, a power source, and a self-contained motor and drive system. The contra-rotating rings with attached airfoils rotate about the center axis of the apparatus and generate lift.

In one variant, the capability of generating lift primarily from ambient air currents is introduced. This allows the vehicle to, inter alia, stay aloft with minimal or even no energy consumption.

In a second aspect of the disclosure, methods of operating the apparatus are disclosed.

In a third aspect of the disclosure, a lift generating mechanism is disclosed. In one embodiment, the mechanism comprises at least two contra-rotating rings having a plurality of airfoils disposed on each. In one variant, the airfoils may individually (or in unison) change pitch or attitude. In another variant, the airfoils may also extend radially from the rings so as to increase the effective diameter of the apparatus.

In a fourth aspect of the disclosure, an airfoil mechanism is disclosed. In one variant, the mechanism comprises a plurality of airfoils disposed on the aforementioned contra-rotating rings and each configured to articulate around a rotational axis, each of the axes being oriented radially with respect to the ring(s). In another variant, the airfoil mechanisms are each radially extendable, such that the effective airfoil surface area is increased.

In a fifth aspect of the disclosure, business methods relating to the apparatus are disclosed.

In a sixth aspect of the disclosure, an apparatus for the remote operation of the VSTOL apparatus is disclosed.

In a seventh aspect of the disclosure, a method for generating lift with the VSTOL apparatus is disclosed.

In an eighth aspect of the disclosure, methods of controlling the VSTOL apparatus are disclosed.

In a ninth aspect of the disclosure, a method of operating the VSTOL apparatus to utilize prevailing air currents to generate lift is disclosed.

In a tenth aspect, a low-observable VSTOL apparatus is disclosed.

In an eleventh aspect of the disclosure, a method of reducing the radar cross section (RCS) of the VSTOL aircraft during flight is disclosed.

In a twelfth aspect of the disclosure, an extensible airfoil apparatus is disclosed.

In a thirteenth aspect of the disclosure, a lift generation system is disclosed. In one embodiment the system comprises: (i) one or more pairs of rings, (ii) a plurality of airfoils disposed on the rings, and (iii) a drive apparatus configured to contra-rotate each of the pairs of rings. The lift generation system is configured to generate lift via airflow around the airfoils during contra rotation of the pairs of rings.

In a fourteenth aspect of the disclosure, a non-transitory computer readable medium configured to store at least one computer program thereon is disclosed. In one embodiment, the computer program comprises a plurality of instructions configured to, when executed: control various aspects of the operation of a VSTOL apparatus such as by use of airfoil attitude control. In one variant, the computer program takes in physical input signals such as from an altimeter, accelerometer(s), electronic or electromagnetic compass, etc., and controls the flight of the VSTOL apparatus.

In one variant, the various aspects include automated piloting of the VSTOL apparatus.

In another variant, the various aspects include assisting and translating remote piloting instructions received from a remote source.

In yet another variant, the various aspects include control of sensory equipment disposed on the VSTOL apparatus.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 3c is a perspective view of a portion of a rotating ring with extensible airfoil.

FIG. 4a is a detailed perspective view of one embodiment of the articulation apparatus for articulating the airfoils of the VSTOL apparatus of FIG. 3a.

FIG. 6 is a perspective view of the articulation apparatus of FIG. 4 in the fully raised position.

DETAILED DESCRIPTION

Reference is now made to the drawings, wherein like numerals refer to like parts throughout.

Overview

In one aspect, the present disclosure provides methods and apparatus for vertical short takeoff and landing (VSTOL). In one embodiment, the apparatus uses contra-rotating rings (e.g., two) with a plurality of articulating airfoils attached at the circumference of each to generate lift. The apparatus can be driven by one or more electric motors supplied by photovoltaic (solar) cells, one or more battery cells, by a combustion engine (e.g., two-stroke, four stroke, or even turbojet), or alternatively via satellite downlink supplying an electromagnetic (e.g., microwave range) radiation beam which would each supply power to a drive arrangement that is completely contained within the apparatus.

In another aspect, the aircraft is configured to reduce its motor function and use prevailing wind currents to maintain altitude and position and/or generate lift.

Detailed Description of Exemplary Embodiments

Exemplary embodiments are now described in detail. While these embodiments are primarily discussed in the context of an unmanned military aircraft, it will be recognized by those of ordinary skill that the present disclosure is not so limited. In fact, the various aspects are useful for vertical short takeoff and landing from in a variety other contexts. For example, embodiments may be readily adapted for use as remote viewing and/or other sensory aids (e.g., audio, IR, ionizing, radiation, electromagnetic radiation such as wireless communications) for law enforcement, drug interdiction, or private investigators. Similarly, embodiments could be used for opportunistic video equipment deployment (sport events, disaster areas, or zones too dangerous for personnel such as over high radiation areas).

Furthermore, while the disclosure is discussed primarily in the context of generating lift in a gaseous fluid medium such as the earth's atmosphere, it will be recognized by those of ordinary skill that the architectures and principle disclosed herein could be readily adapted for use in other operating environments, such as liquids, with the discussion using gaseous mediums merely being exemplary.

It will also be recognized that while particular dimensions may be given for the apparatus or its components, the apparatus may advantageously be scaled to a variety of different sizes, depending on the intended application. For instance, the disclosure contemplates a small table-top or even hand-held variant which may be useful for e.g., low altitude surveillance or the like. Likewise, a large-scale variant is contemplated, which may carry a more extensive array of sensors and even weapons (such as e.g., Hellfire precision guided munitions or the like), have greater loiter and altitude capabilities, etc. This design scalability is one salient advantage of the apparatus.

Exemplary Apparatus and Operation—

Figure 1:
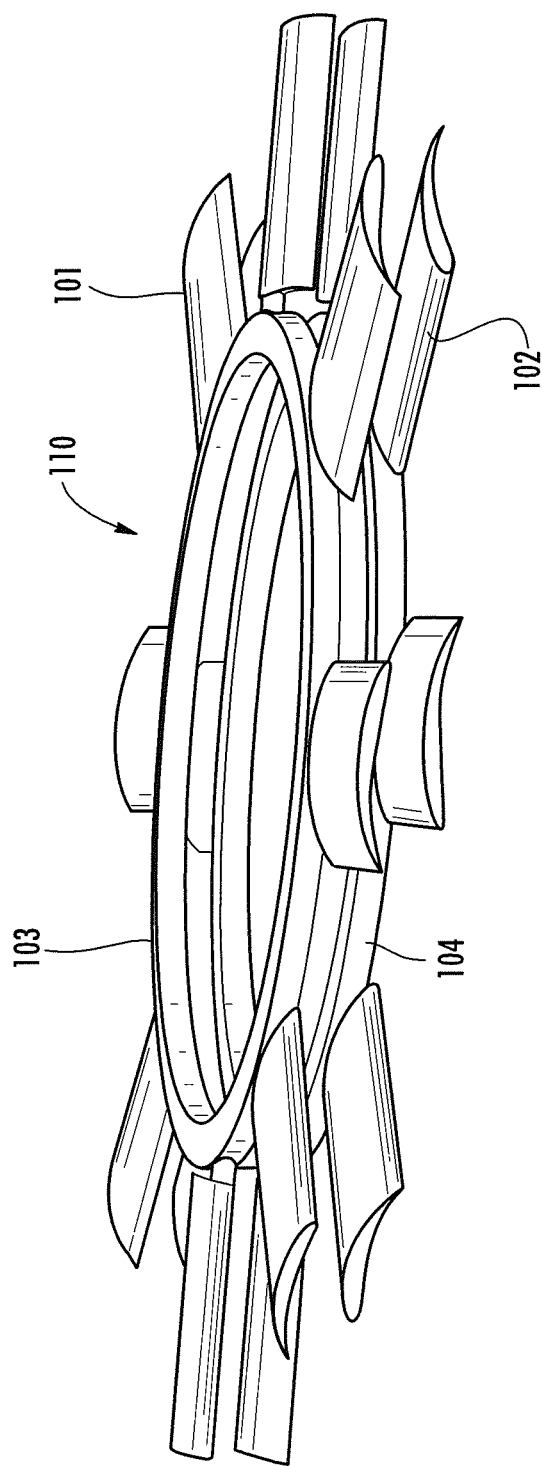
FIG. 1 is a perspective view of the lift mechanisms of one exemplary embodiment of a vertical short takeoff and landing (VSTOL) apparatus in accordance with principles presented in the disclosure provided herein.

Referring now to FIG. 1, an exemplary embodiment of a lift mechanism 100 for a VSTOL apparatus is shown and described in detail. The lift mechanism of FIG. 1 includes two (2) counter driven rings disposed in parallel, including an upper 103 and a lower ring 104. Attached to the upper and lower ring are upper airfoils 101 and lower airfoils 102, respectively. Each of the airfoils generally has a curved shape such that it is capable of generating lift while being rotated through the surrounding air. Accordingly, as the upper and lower rings of the mechanism 100 spin, the airfoils create lift (or alternatively downdraft, or negative lift, depending on the orientation of the airfoils as discussed infra). Each of the airfoils includes a generally curved or rounded leading edge and a narrower trailing edge portion. In the embodiment illustrated, the upper airfoils curved leading edge is positioned such that the upper rotating ring will generate lift by rotating in a counter clockwise direction (when viewed from above). Conversely, the lower airfoils curved leading edge is positioned such that the lower rotating ring generates lift by rotating in the opposite direction (i.e. clockwise). While a specific configuration is shown, it is appreciated that the leading edges for the upper and lower airfoils could be reversed such that an opposite rotation (i.e. clockwise rotation for the upper airfoils and counter clockwise rotation for the lower airfoils) will generate lift for the VSTOL apparatus.

Figure 1A:
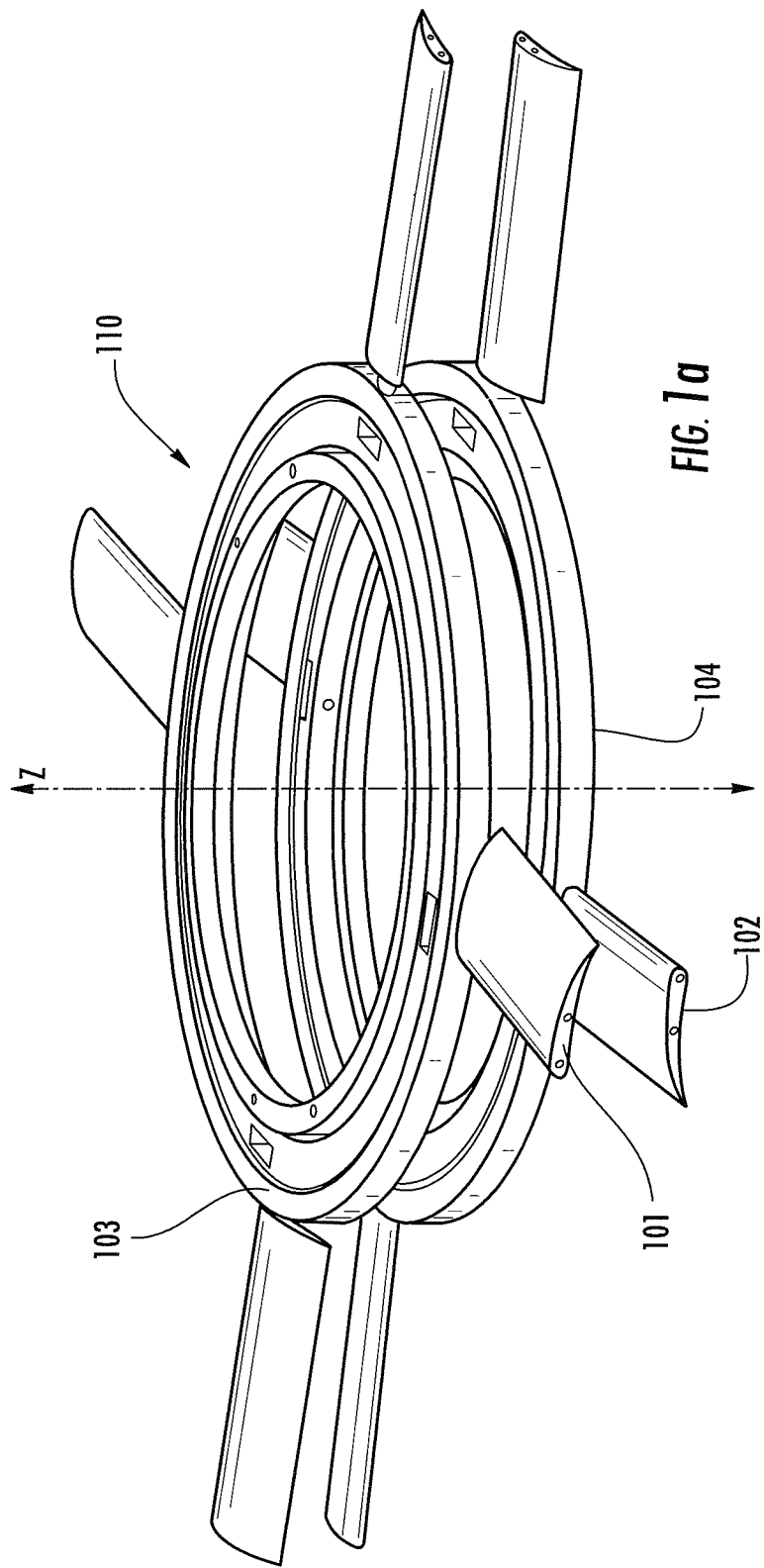
FIG. 1a is a perspective view of the lift mechanisms of a second exemplary embodiment of a VSTOL apparatus.

Referring now to FIG. 1*a*, a configuration with four airfoils per ring is shown 110. This configuration allows the lift system to be optimized with respect to the shape and scale of the apparatus, although other airfoil shapes and sizes, and/or number of airfoils may be employed depending on the desired characteristics).

As the upper and lower rings rotate in opposite directions and are essentially identical in construction (albeit in a reversed orientation), the combined motion of the rings generates no net torque on the apparatus when the upper and lower rings are rotated at the same speed. This is useful in that additional rotors, or rotors oriented in an orthogonal orientation (such as that seen in conventional helicopters) are not necessary in order to provide counter rotation. In addition, by varying the relative speeds of the counter rotating rings, a net torque can be generated, thereby allowing the VSTOL apparatus to rotate about a central (vertical) axis, again without necessitating an additional rotor.

In addition, the multiple rings allow for increased lift capability, because they allow for more points for lift generation. Furthermore, as will be appreciated later in the specification. The coordination of the upper and lower airfoil elements leads to a synergistic improvement of lift capacity. Considerations related to this coordination of upper and lower airfoils (including ring spacing, airfoil shape, rotational speed, etc.) can aid in effective airfoil/ring design that e.g., maximizes upward lift.

Figure 2:
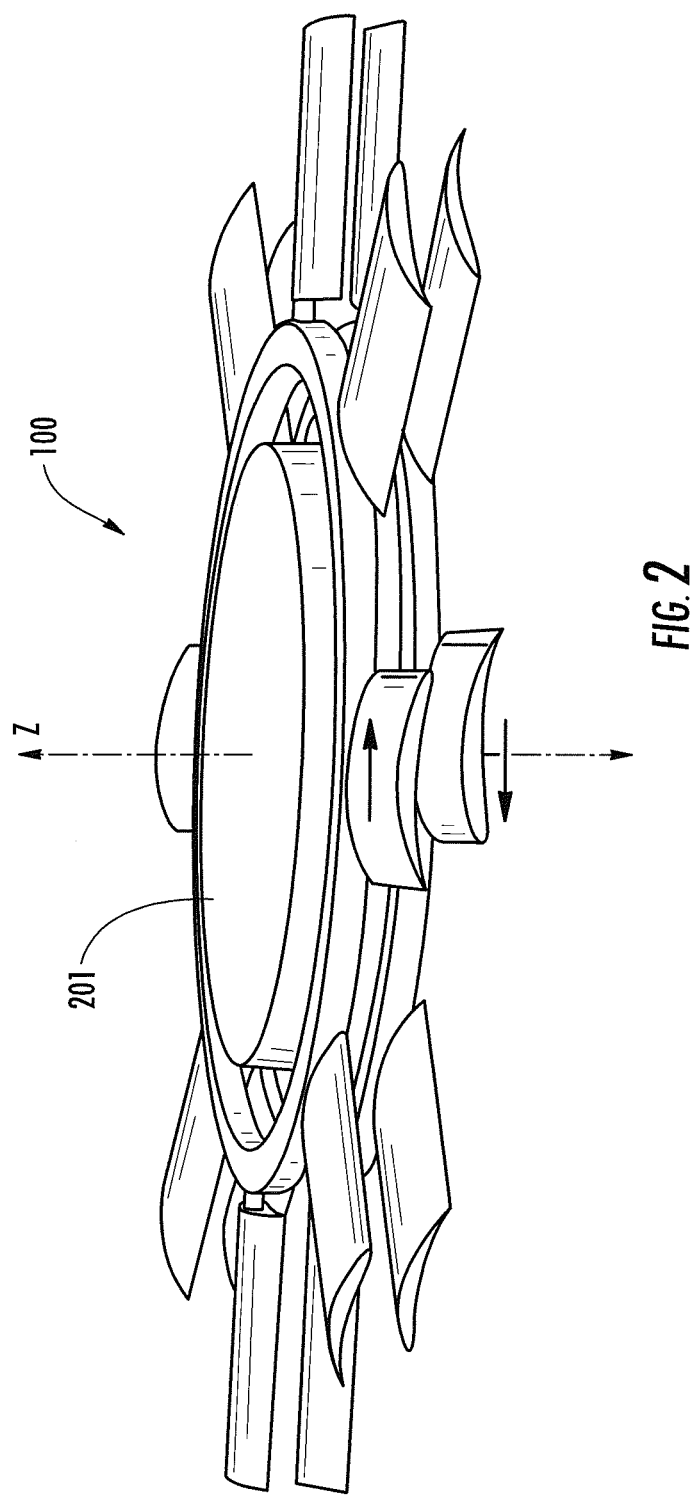
FIG. 2 is a perspective view of the VSTOL apparatus of FIG. 1, with a disc-shaped fuselage installed.
Figure 3:
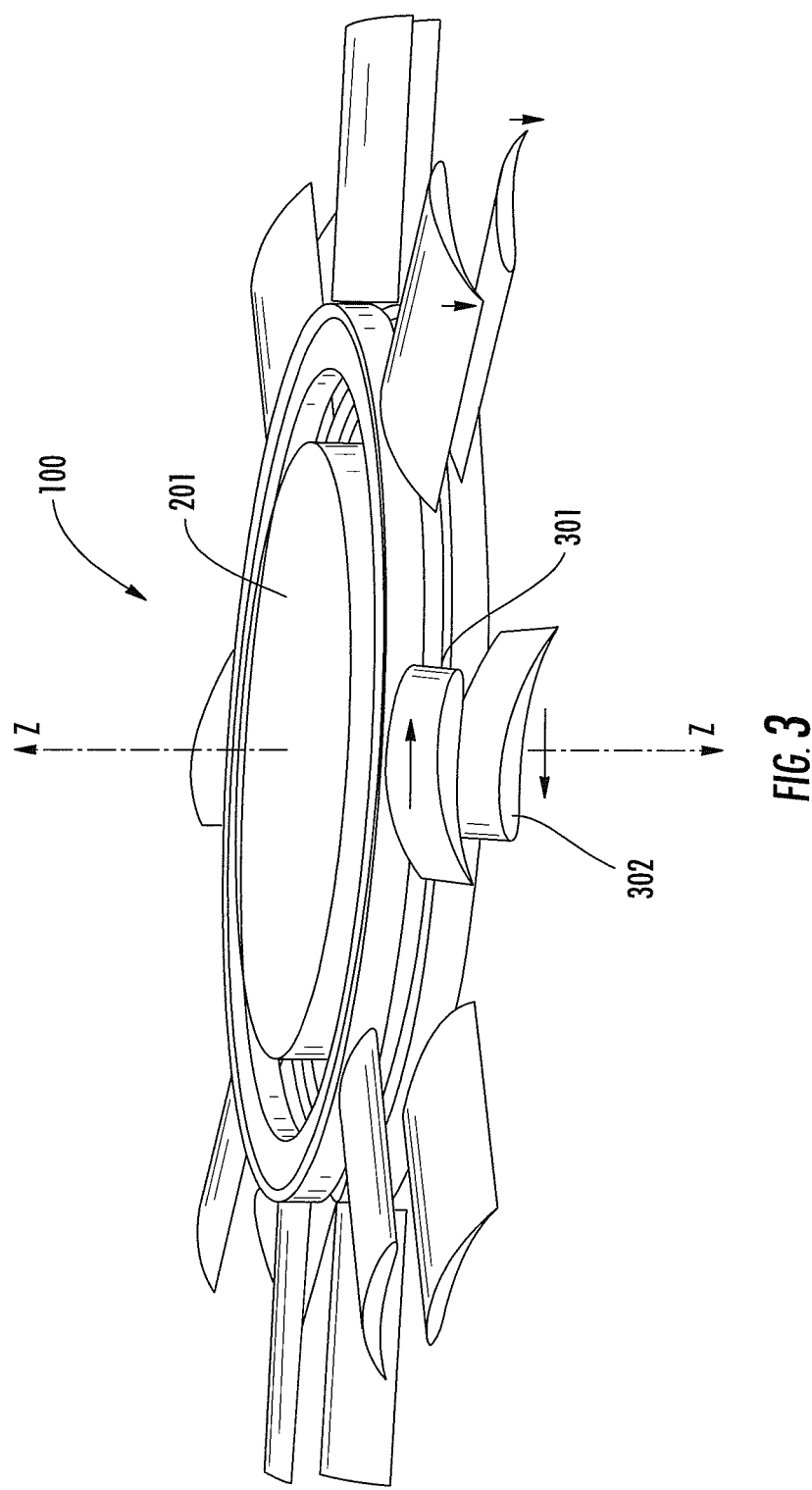
FIG. 3 is a perspective view of the exemplary VSTOL apparatus of FIG. 2, illustrating the articulation of the airfoils thereof.

Referring now to FIG. 2, a perspective view of an exemplary embodiment of the VSTOL apparatus of FIG. 1 is shown, with a disc-shaped fuselage 201 supported within the rings. This placement of the fuselage with respect to the rings is effective in that as previously discussed, no torque will be imparted on the fuselage, thereby keeping it substantially fixed in orientation during flight. Thus, the centro-symmetric design allows for a highly agile aircraft, because actions such as turning can be performed with effectively a zero radius and with only minimal power expenditure. For example, a brake (e.g., frictional mechanism) could be applied to the one or more of the rotating rings or a power ring. This would result in axial rotation and turn the aircraft. Furthermore, to tilt the aircraft, the airfoils can be articulated at control points to increase or decrease the amount of lift they generate. Thus, more or less lift is generated from one side of the aircraft, and the VSTOL apparatus would tilt. See discussion of FIG. 3*b* below.

Figure 2A:
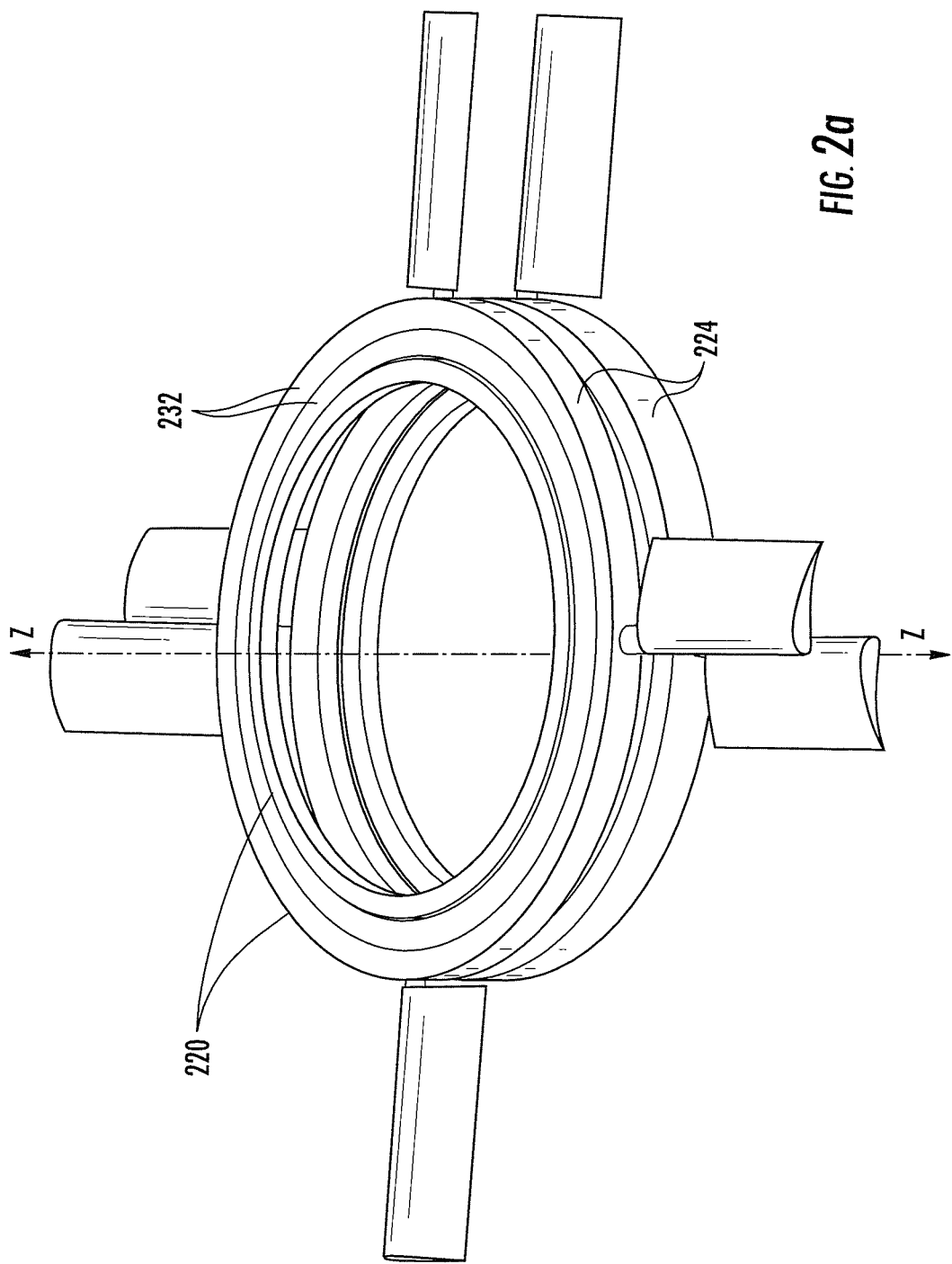
FIG. 2a is a perspective view of the VSTOL apparatus of FIG. 1a, with a support frame for a fuselage attached.

Referring now to FIG. 2*a*, a perspective view of an exemplary embodiment of the VSTOL apparatus of FIG. 1*a* is shown. In this configuration, a frame for supporting a fuselage is shown 220. The upper and lower portions of the frame are each surrounded by a pair of rotating rings (223 and 224). Each pair of rings is rotated in tandem and, as discussed infra, are used to control the articulation of the airfoils in some embodiments.

Moreover, the placement of the fuselage in the embodiment of FIG. 2 also reduces the strain experienced by the airfoils. Furthermore, the lack of a central hub or axle increases room for both sensors and cargo (e.g., munitions).

Another key advantage of this design is that it facilitates an aerodynamic fuselage. The disc shape allows for a large volume while still maintaining a relatively small cross-section with respect to the direction of transverse flight (e.g., laterally). This will lead to reduced power loss due to drag, and a reduced radar cross section (RCS) as discussed in greater detail subsequently herein.

It can also be appreciated that advantages from gear reduction (e.g., between the output shaft of the drive source, such as a motor or engine, and the drive applied to the rings) can easily be leveraged using the contra-rotating ring design described herein. In fact, the rings themselves can act as the main reduction gears given that the drive system of the VSTOL apparatus is located entirely within the circumference of the rings.

The fuselage comprises in one embodiment the power source (e.g., solar cell, battery, or engine, etc.) and motor(s) to drive the rotation of the rings, and to articulate the airfoils. In the illustrated embodiment, the fuselage is designed for unmanned operation, although it could conceivably house a cockpit for a passenger if the size of the aircraft was sufficient to lift such weights effectively. In either of these implementations, a host of weapon or surveillance systems may also be housed in the fuselage, again limited by an appropriate size and lift capacity. Weapons bays may also be internalized within the fuselage (e.g., akin to those on the F-22 Raptor) if desired, thereby reducing aerodynamic drag and RCS.

In one embodiment, the fuselage is made from a lightweight composite material (e.g., graphite-based or urethane-based using epoxies as bonding agents) for both strength and reduced weight, although other materials may be used.

The fuselage may also be adapted to house autonomous navigation equipment, such as a Global Positioning System (GPS) receiver, and computerized navigation system. This would be required to varying degrees depending on the level of autonomy desired. The fuselage may also house a computer configured to control and operate the VSTOL apparatus (i.e., altitude, attitude, pitch of the airfoils, etc.), whether with or without human or other external input. Such a system might use an external communication link such as a ground-based or satellite based wireless link. The fuselage may also house onboard instruments for navigation e.g. laser ranging systems, electro-optic or IR machine vision, altimeter, radar, gyroscopes, and/or optical gyroscopes, etc.

In other configurations, all or a subset of the airfoils may have their pitch adjusted with respect to the rings; e.g., they may rotate around their axis of attachment to the ring. Using control rings, the variable airfoil pitch can be adjusted allowing for lift control. Referring now to the perspective view in FIG. 3, the airfoils 301, 302 on the apparatus are shown having been articulated (rotated generally around their attachment axes—not shown, but described below). Specifically, the upper ring airfoils 301 have been rotated counter-clockwise (when viewed from their end), while the lower ring airfoils 302 have been rotated clockwise. These two rotations provide additional lift for each ring, respectively.

Figure 3A:
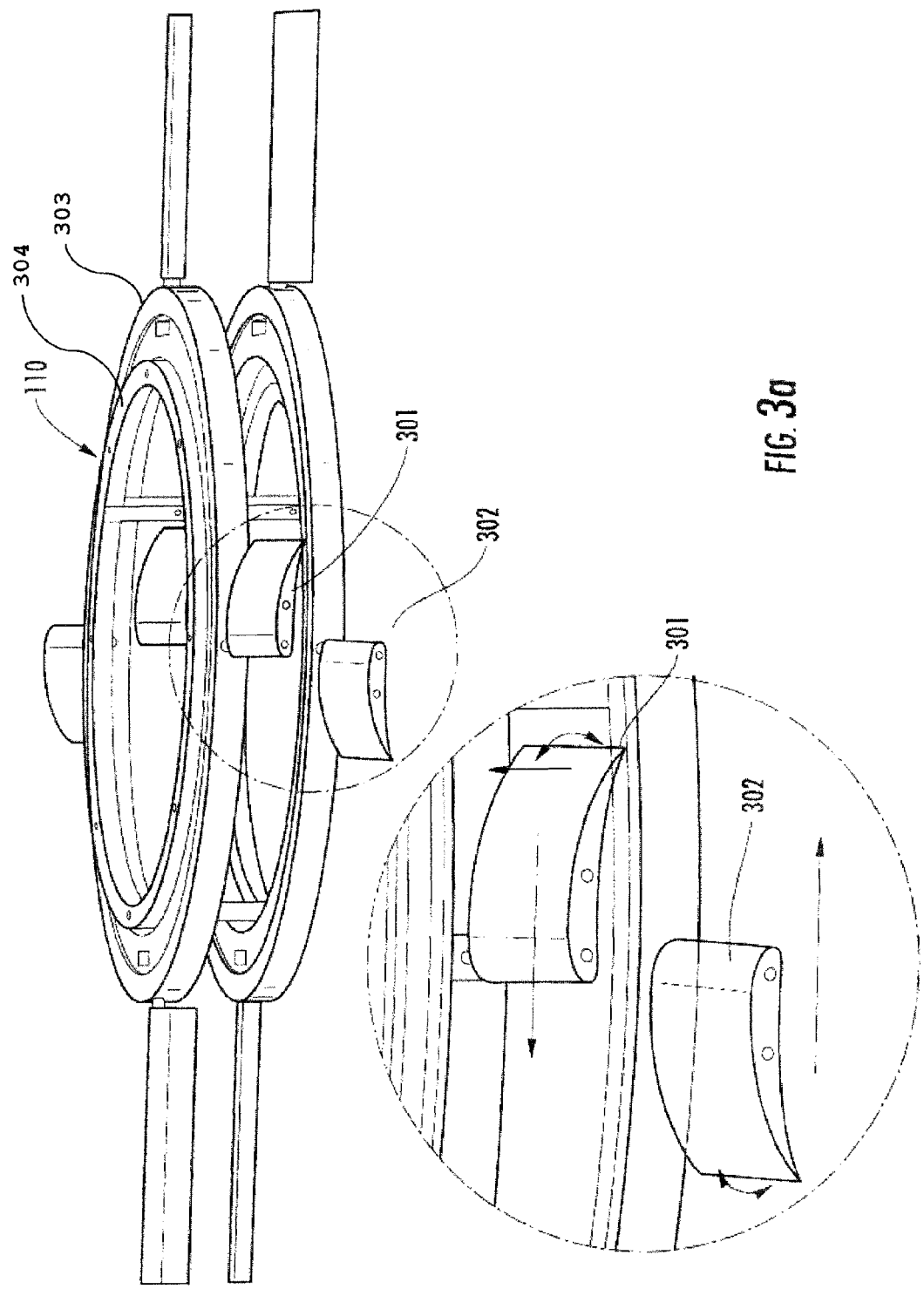
FIG. 3a is a perspective view of the exemplary VSTOL apparatus of FIG. 2a, illustrating the articulation of the airfoils thereof.
Figure 3B:
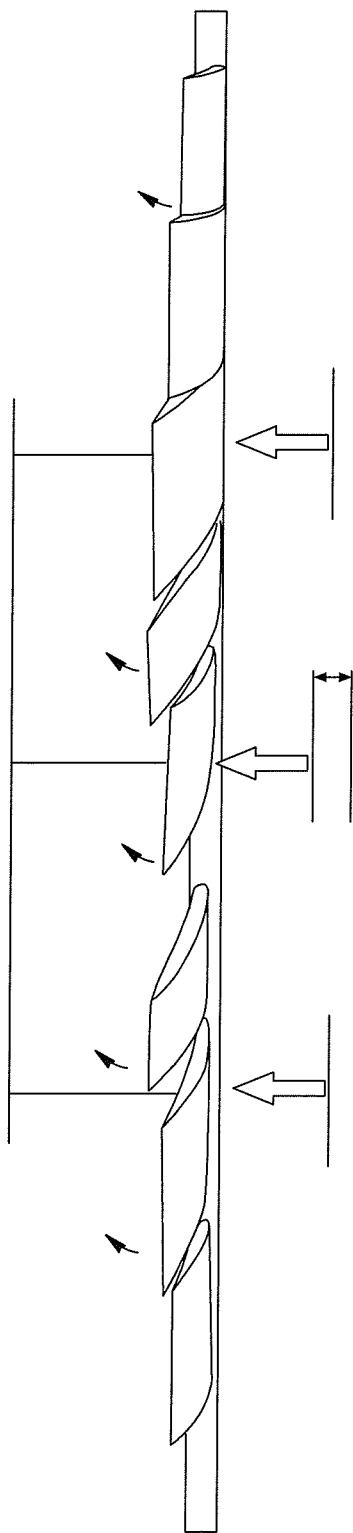
FIG. 3b is a side view of a portion of the VSTOL apparatus of FIG. 2a, illustrating the operation of the airfoils as they rotate past a control point.

Similarly, FIG. 3a shows the directions of motion and articulation for the airfoils in the embodiment depicted in FIG. 1a.

It can be appreciated that in some versions, only the airfoils 301 on the upper ring (or conversely those 302 on the lower ring) could be articulated. While in other designs, the airfoils 301 and 302 on both the upper and lower rings can be articulated.

In one implementation of the VSTOL apparatus (shown in FIG. 3a and FIG. 3b), three control points are used on the control ring 303 (discussed in greater detail below). The control ring rotates with the power ring 304; however, it is independent of the power ring's horizontal constraint (i.e., requirement that the power ring maintain a substantially fixed horizontal position). When one of the aforementioned control points has been articulated (center arrow in FIG. 3b), just the control ring moves, changing the pitch of the airfoils (within that control point's affected area). The other two control points remain fixed (unless they too are actuated or controlled).

FIG. 3c illustrates another embodiment of the exemplary airfoil. In this embodiment, radially extensible airfoils 350 are used so as to permit the effective length of the airfoil to change. In one variant, the extensible portion 352 slides outward from within the non-extensible portion 354, thereby increasing the effective length (and hence lift provided by) each airfoil. Such extensibility may be desirable for e.g., changing altitude, operating at different altitudes (i.e., having different air densities), changing the efficiency of the apparatus, maneuvering, altering the radar cross-section (RCS) of the aircraft, etc. In one implementation, the extension is provided by a rod 356 mounted to the inner radius of the extensible portion 352 on one end, and to a retraction/extension mechanism on the other (e.g., a screw or worm drive gear, hydraulic actuator, electromagnetic solenoid, etc.). In another variant, one or more springs are used such that centrifugal force of the rotating rings (and airfoils) tends to pull the extensible portions 352 outward against spring force, such that greater extension (and lift (is achieved at greater ring rotational speeds. Various other schemes for controlling the position of the extensible portion 352 will be recognized by those of ordinary skill given the present disclosure.

Figure 4:
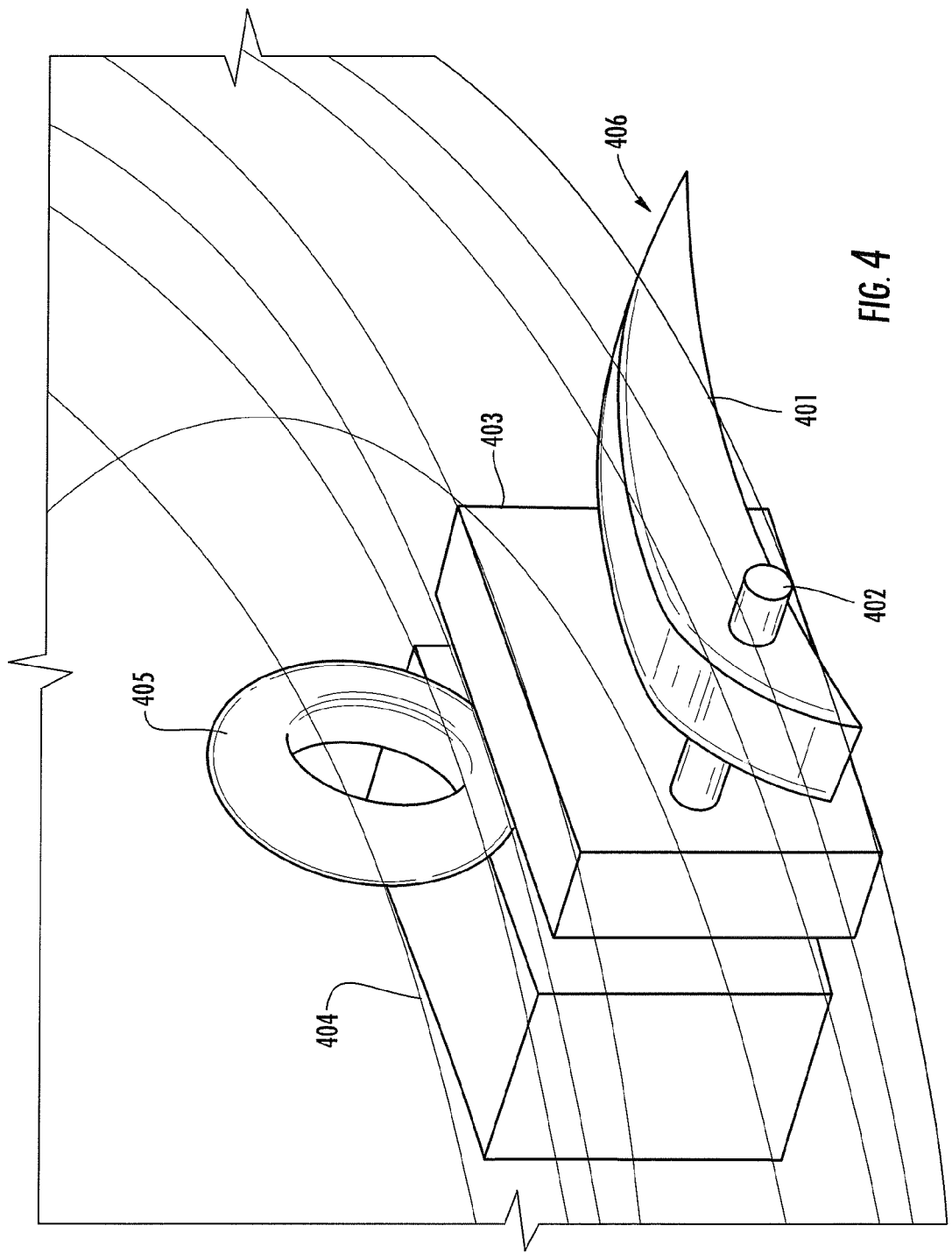
FIG. 4 is a perspective view of one embodiment of the articulation apparatus for articulating the airfoils of the VSTOL apparatus of FIG. 3.

Referring now to FIG. 4, a perspective view of an exemplary embodiment of an apparatus for articulating the airfoils 101, 102 is shown and described. In this embodiment, the pitch of the airfoils (i.e., angle with respect to the plane of ring rotation) is controlled via two rods. One rod 401 penetrates radially at the tail of the airfoil, and the other rod 402 penetrates at the front portion of the airfoil. One rod 401 is attached to a control element 403 (e.g., control ring) and is capable of moving up or down with respect to the main rotating ring (FIG. 1, 103 or 104) on which the airfoil is mounted. The second rod 402 is attached to a second element 404 (e.g., power ring) disposed interior of the control ring and which is stationary with respect to the ring on which the airfoil is mounted. A slot 408 allows the second rod 402 to move therein when the control element 403 is moved up or down. In this fashion, when the control element 403 is moved upward or downward relative to the second element 404, the angle of the airfoil decreases or increases, respectively. The tail of the airfoil 406 is shown in the neutral position in FIG. 4.

It will be recognized that the foregoing functionality may be realized alternatively by inverting the connections of the rods; i.e., the second rod 402 may be fixed to the first control element 403, and the first rod to the second element 404, such that the movement described above produces the inverted response (i.e., upward movement increases angle, etc.)

Likewise, the functions of the control elements can be changed. For instance, using the configuration shown in FIG. 4, instead of maintaining the inner (second) control element fixed and moving the outer (first) element, the outer element 403 can be fixed, and the inner (second) element 404 can be moved up and down.

Moreover, the foregoing functions could be served by the actual rings (103 or 104) as opposed to one or more of the control elements 403, 404. Alternatively, a pair a rings rotating in unison, but free to move with respect to one another in the direction orthogonal to the rotational plane, would be able to function as both of the platforms (403 and 404). More detailed descriptions of such embodiments will be provided later in the specification.

As shown in FIG. 4, several wheels 405 are also used to provide for low-friction rotation of the two rings position the first platform.

Figure 4A:
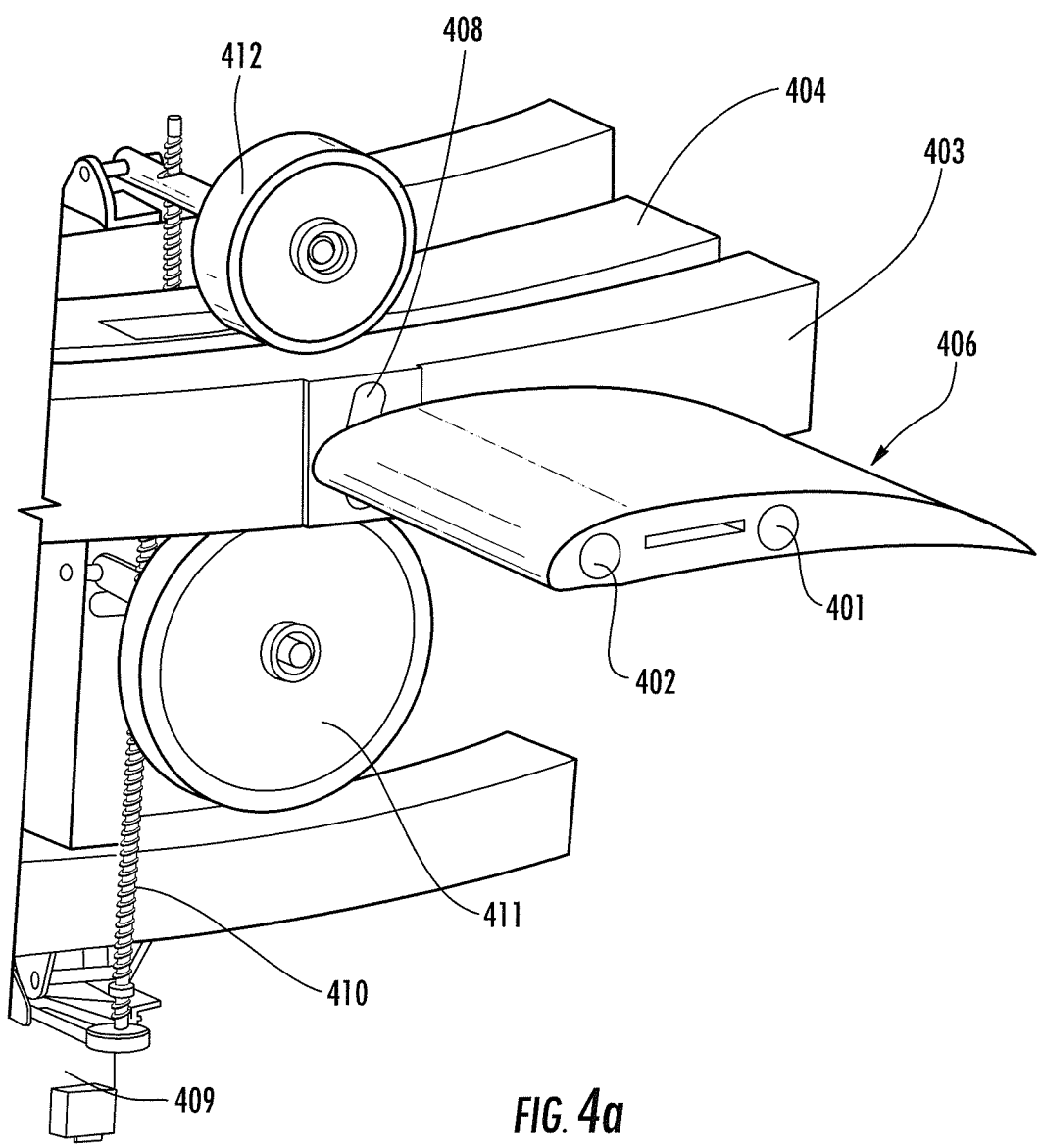

Referring now to FIG. 4a, details of an exemplary configuration of an articulation system for the airfoils is shown. This system uses the two control rod mechanism shown in FIG. 4. In the embodiment of FIG. 4a, the articulation system is driven by a stepper motor 409 which turns a screw thread 410. The screw thread controls the position of two wheels (411 and 412). These wheels then depress or raise the rings they are in contact with. This alters the relative position of the two rings, and articulates the airfoils.

It can be appreciated that alternatively, the screw thread can be used to drive mechanics inside the rotating rings. Thus, the airfoils can be positioned without changing the relative position of the rings. Furthermore, the screw thread and wheel combination can be used to position localized portions of the rotating rings. Thus, in some embodiments, the airfoils can be positioned independently of one another.

In other versions, the first control element moves along the arc of a circle or ellipse or other function to facilitate rotation of the airfoil. The airfoils may also be allowed to translate at least somewhat in the circumferential direction if desired. Such features allow for more fluid positioning.

Figure 5:
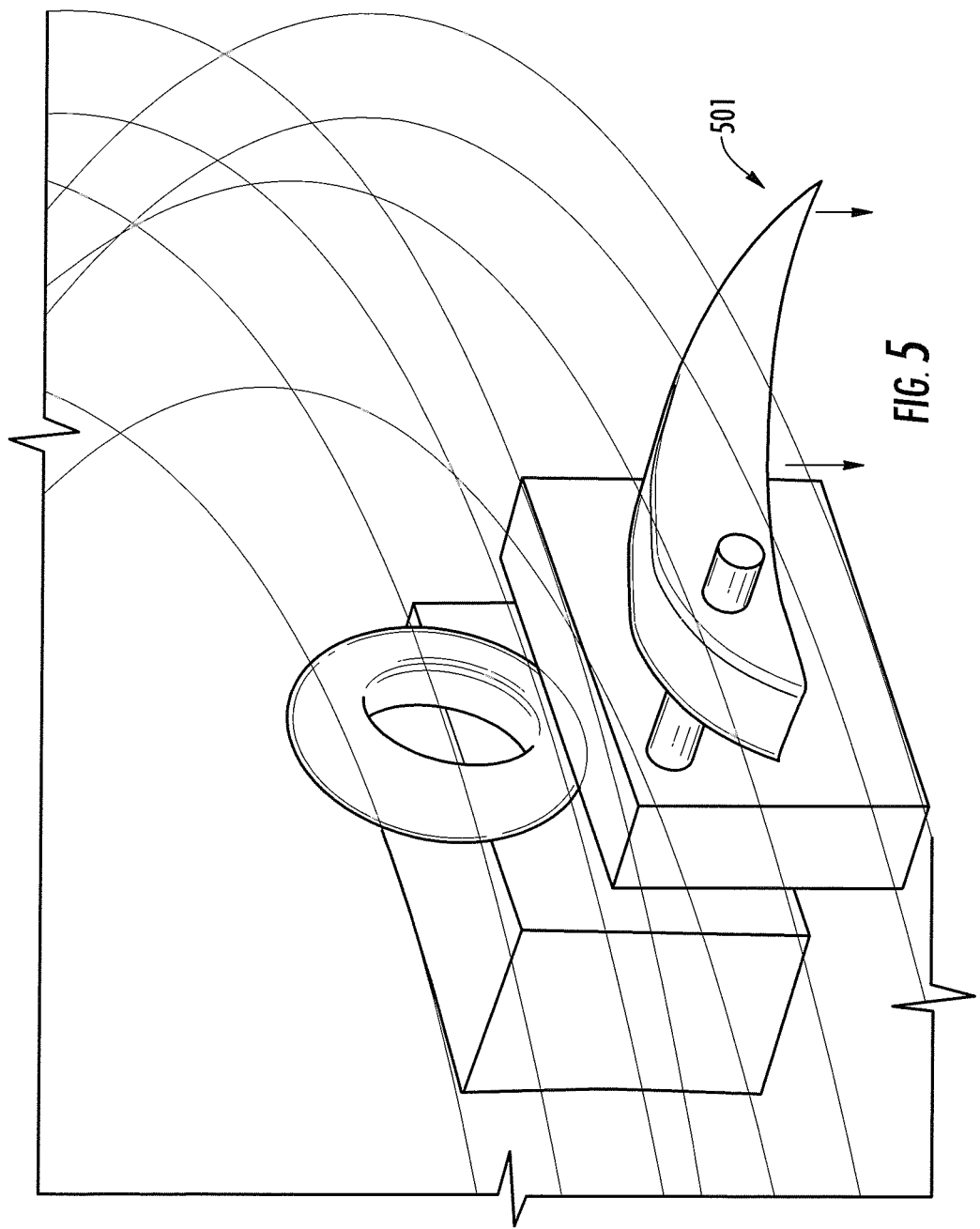
FIG. 5 is a perspective view of the articulation apparatus of FIG. 4 in the fully lowered position.
Figure 5A:
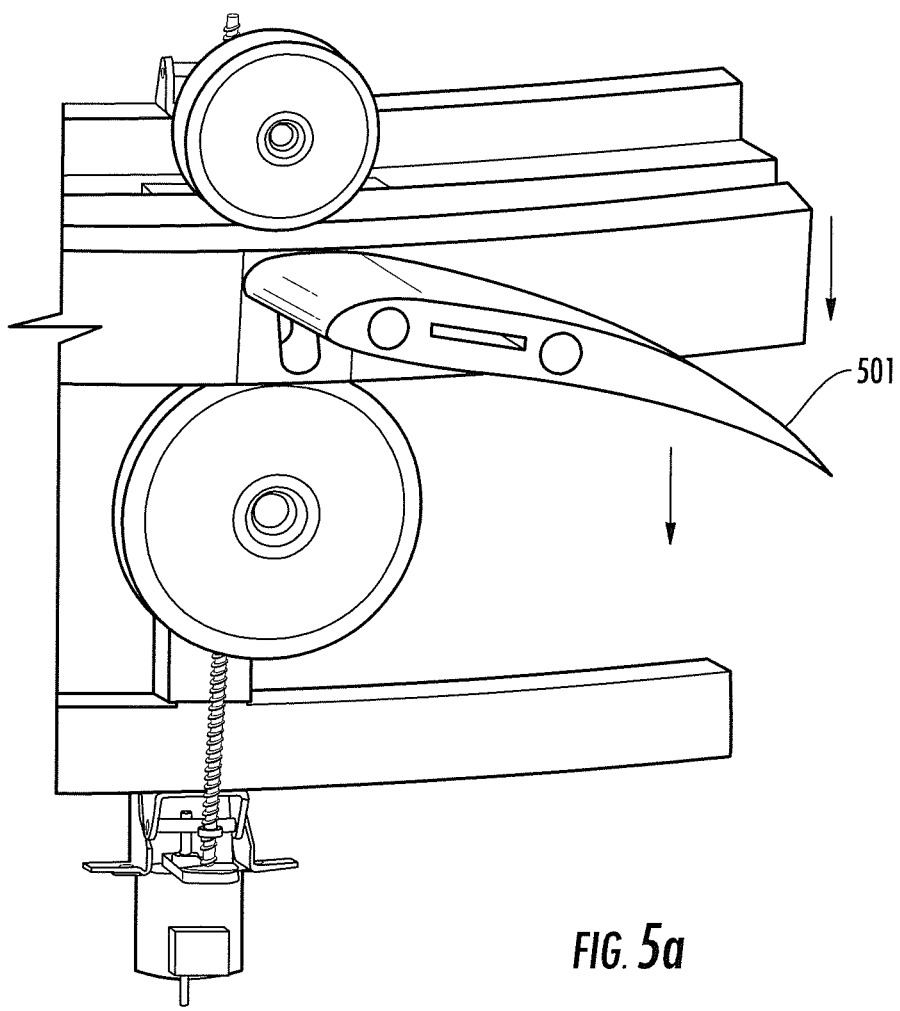
FIG. 5a is a perspective view of the articulation apparatus of FIG. 4a in the fully lowered position.
Figure 6A:
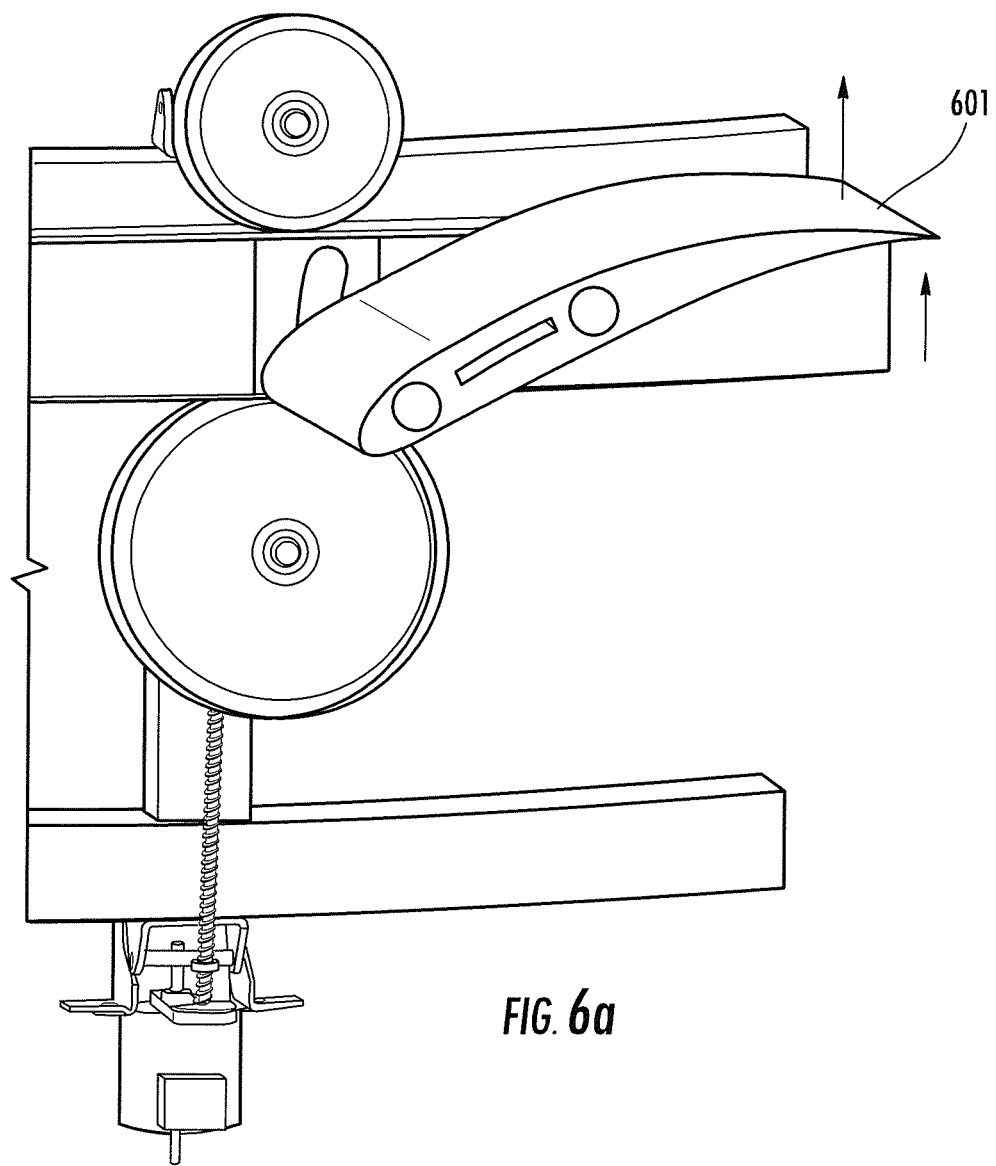
FIG. 6a is a perspective view of the articulation apparatus of FIG. 4a in the fully raised position.

Referring now to FIG. 5 and FIG. 5a, the tail of the airfoil of FIG. 4 is shown in its fully lowered position 501. In FIG. 6 and FIG. 6a, the tail of the airfoil is shown in its fully raised position 601.

It can also be appreciated that the airfoils can comprise flaps, slats, or other extensible control surfaces that can be expanded or contracted to change the shape of the airfoils. The change is shape can be used to reduce or increase the lift achieved through the airfoils. Moreover, deicing can be achieved by altering the shape of the airfoils, potentially loosening built-up ice.

In yet another variant, the airfoils are substantially deformable in shape via internal mechanisms. Unlike the "flap" variant referenced above (which basically exaggerates the shape of the airfoil by extending the tail portion outward so that the leading edge to tail edge distance increases), the actual curvature of the airfoil can be altered mid-flight so that the Bernoulli effect (and/or other aerodynamic properties) are altered as desired. In one implementation, the outer surface of the airfoils comprises a substantially pliable polymer "skin" laid over a frame, the latter being mechanically deformable in shape by way of one or more articulated joints. Yet other approaches will be recognized by those of ordinary skill given the present disclosure.

Other potential implementations may utilize airfoil flaps that can be extended or retracted to change the shape of the airfoils. Through this airfoil extension and contraction, the aerodynamic cross-section of the apparatus can be altered to facilitate lift via e.g., ambient air currents.

As yet another option, the airfoils may be constructed so as to have a changing pitch/curvature as a function of radial position. For example, in one such variant, the pitch or curvature of the airfoil near the root about which it rotates may be one value, while the curvature changes as the distal (outward) end of the airfoil is approached; i.e., as if one grasped the end of the airfoil and twisted it so as to distort its shape. Such varying curvature may provide desired attributes in certain applications; e.g., greater lift as a function of rotational or angular velocity.

Figure 7:
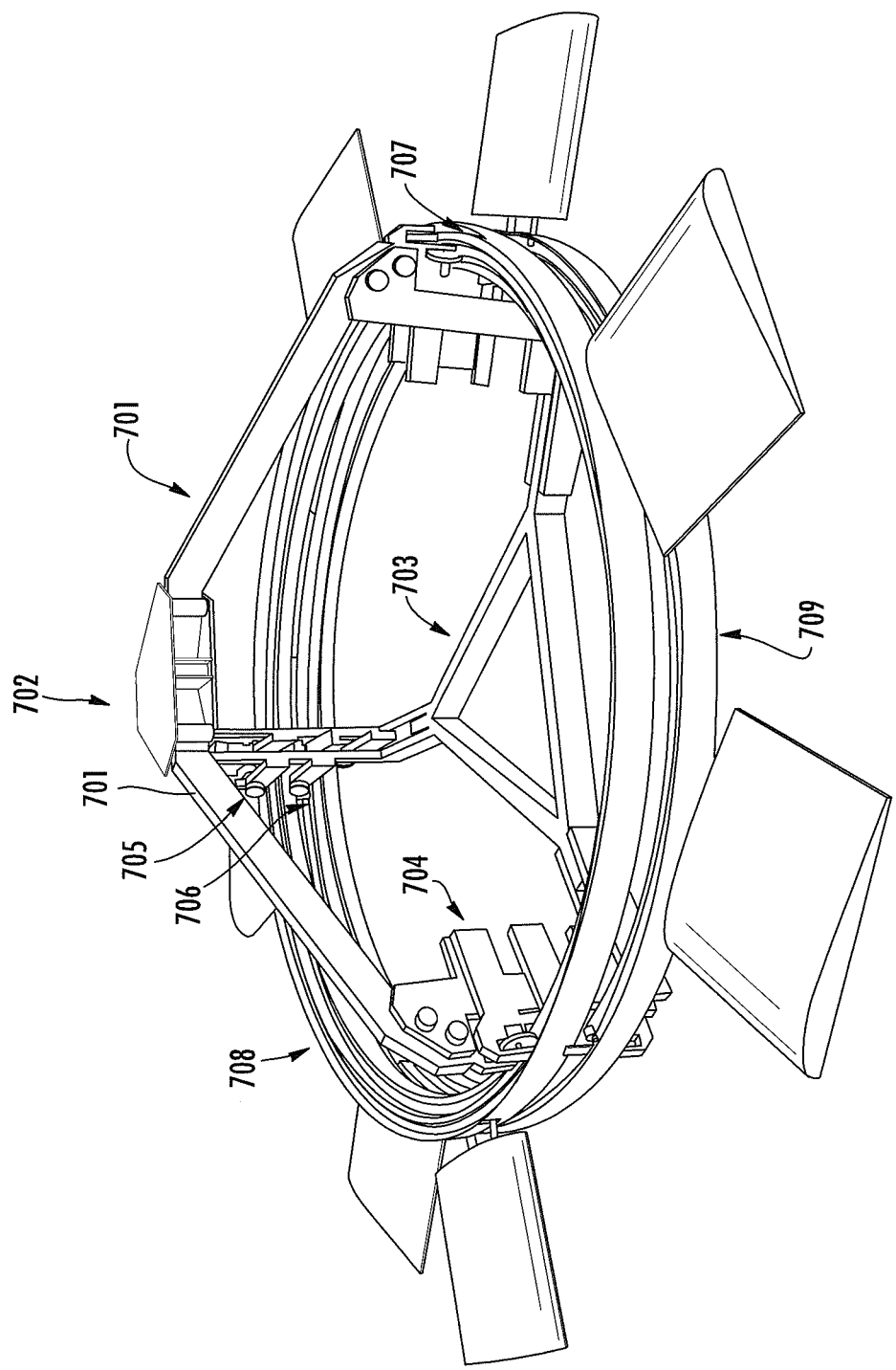
FIG. 7 is a perspective view of an alternative embodiment of a VSTOL apparatus.

Referring now to FIG. 7, a top perspective view of the exemplary VSTOL apparatus is, including a support frame comprising three upper support beams 701 joined at the top of the apparatus by a substantially triangular platform 702. The three upper support beams are connected to a lower triangular support frame 703 via three multi-wheel mounts 704. These wheel mounts allow comprise upper wheels 705 and central 706 wheels and lower wheels 711 which run along sets of tracks 707 in the upper 708 and lower rings 709 for allowing the rotating rings to spin, while the frame supporting the fuselage stays stationary.

The exemplary support frame of FIG. 7 is formed of a lightweight alloy such as a Titanium alloy, although other materials may be used, including polymers (e.g., plastics) or even composites such as carbon fiber composites of the type well known in the aircraft arts.

The configuration of FIG. 7 offers increased structural integrity, while still meeting the stringent weight requirements of the VSTOL apparatus. Specifically, such frame-type construction offers high stability with the adding the cost or weight of full sheets of material. However, it should be noted that full sheets of material can offer advantages in other areas (e.g. armor, aerodynamic drag, optical or electromagnetic shielding, etc.). Hence, while the embodiment of FIG. 7 is illustrated with only a lightweight support frame, it will also be recognized that either (i) the frame may be used with a covering or "skin", (ii) the support frame may be minimized (such as by using very rigid materials, with only a central support "triangle" (not shown), with or without a skin, or (iii) the skin itself may be used to provide the necessary rigidity/support for the airframe. For example, the exemplary fuselage shape of FIG. 2 herein may be formed via an outer skin with sufficient rigidity, such as via a strong, lightweight alloy or composite, thereby saving appreciable weight.

As previously noted, the upper and lower rings (708 and 709) used in this design operate as the platforms for articulating the airfoils (403 and 404). This configuration significantly simplifies the articulation process. In one variant, each "ring" comprises a pair of rings, which rotate in unison; i.e., one stationary main ring, and one control ring that moves perpendicular to the plane of rotation (i.e., up and down). The tail rod 401 of the airfoils is attached to the control ring, and the forward rod 402 of the airfoils is attached to the stationary ring. The airfoils then will rotate as the control ring moves up and down in the direction perpendicular to the direction of rotation.

It can be appreciated that more control rings could also be added to the apparatus. Thus, individual airfoils could be attached to individual control rings. This would allow for independent control of each airfoil. However, in many configurations it might be more advantageous to attach airfoils to rings in such a manner that the center of the ring and its preferred axis of rotation are aligned. This will eliminate unwanted torque generated from non-ideal rotation. Therefore, it may be advantageous to control at least a pair of airfoils with each control ring. Conversely, the torques generated from this non-ideal rotation could be compensated by the complementary contra-rotation of the opposing set of rings.

Figure 8:
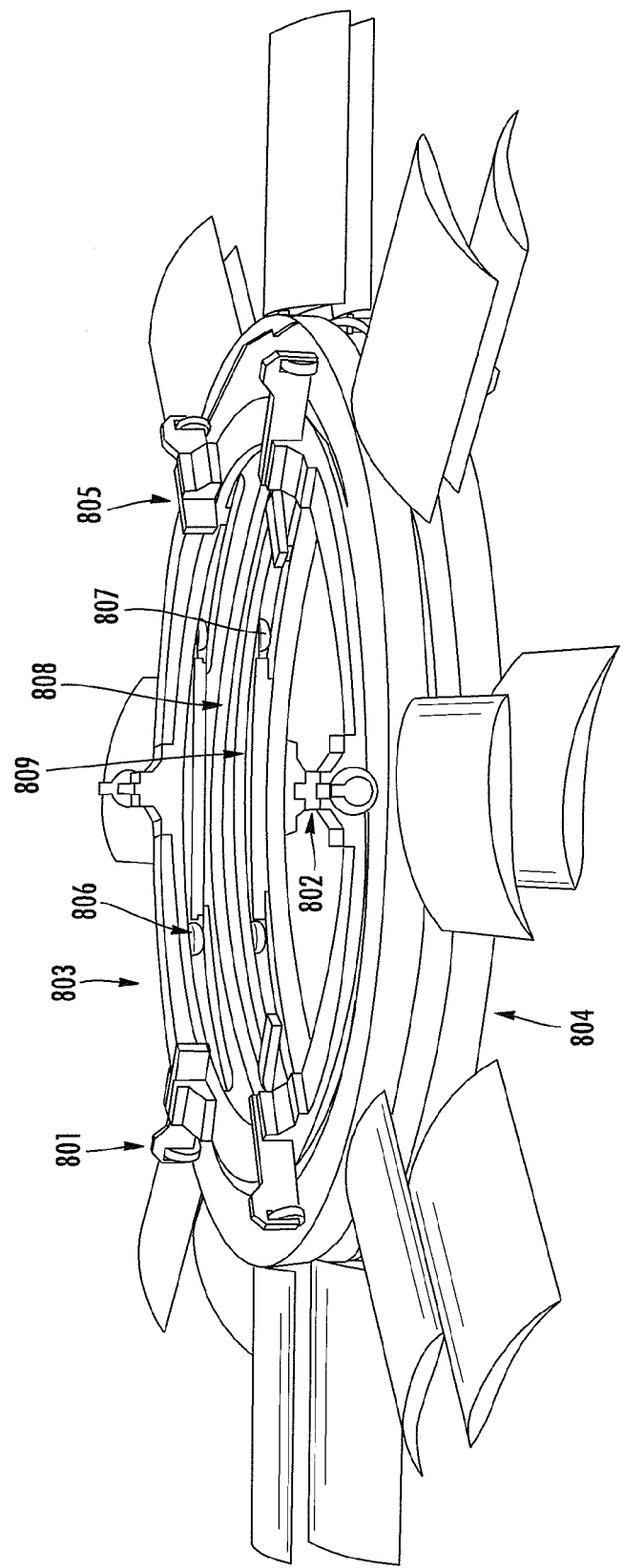
FIG. 8 is a perspective view of yet another alternative embodiment of a VSTOL apparatus in accordance with the principles of the present disclosure.

Other more reductive designs can also be used. In one such exemplary embodiment, a ring-shaped internal frame is used, such as that of FIG. 8. Referring now to FIG. 8, upper and lower exterior wheels 801 and 802 run along the top and bottom of the exterior upper 803 and lower 804 rings, respectively. The wheels are attached to the internal frame via wheel mounts 805. Interior upper 806 and lower 807 wheels run along the inside of the exterior rings just above and below the upper 808 and 809 lower interior rings. Similarly, the exterior and interior rings serve as the platforms 403 and 404 for airfoil articulation.

The ring shaped-frame used in the configuration of FIG. 8 is an effective pairing with an aerodynamic fuselage. Moreover, this configuration does not define the bounds or contours of the fuselage. Thereby, such parameters can be instead defined by the particular needs of any given fuselage configuration (e.g. weapons/sensor storage, cockpit, drive systems, etc.).

Figure 9:
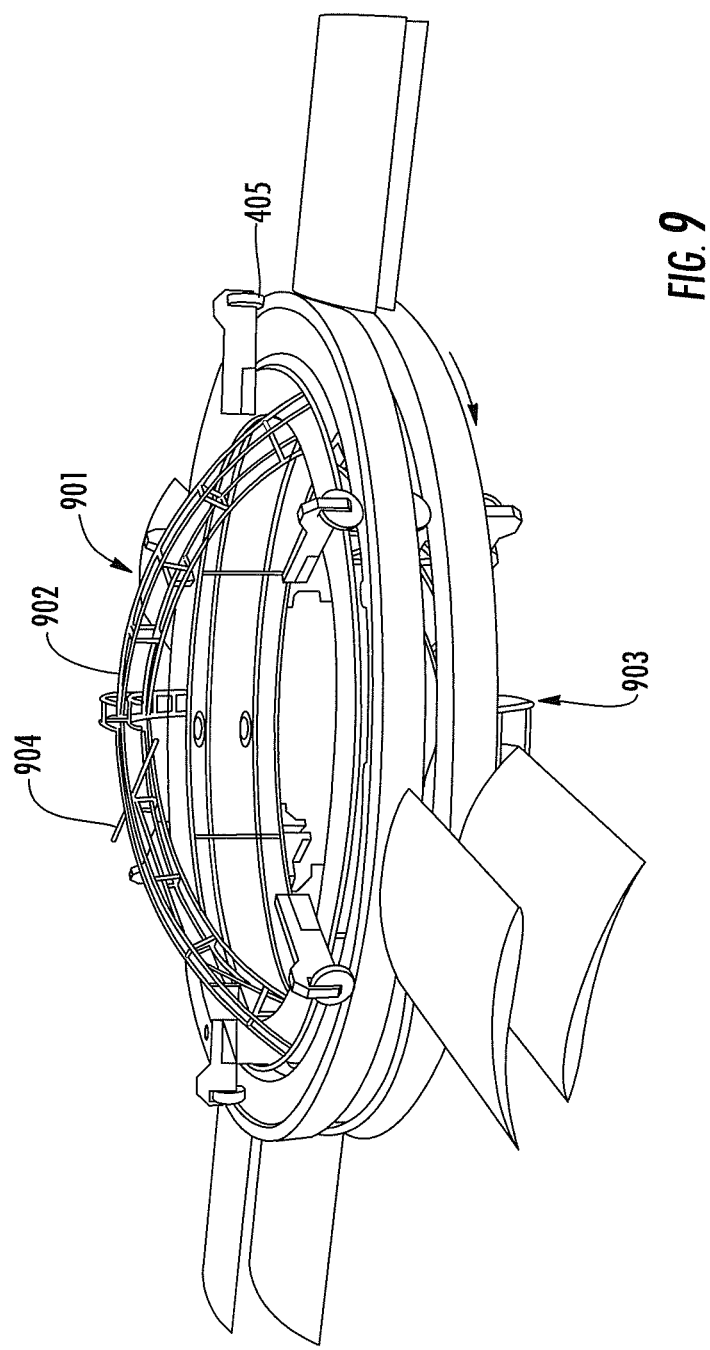
FIG. 9 is a perspective view of still another alternative embodiment of a VSTOL apparatus in accordance with the principles of the present disclosure.

Referring now to FIG. 9, in another configuration, the ring-shaped internal frame in the previous embodiment is made using an economical, lightweight wire-frame 901. It can be made from a wide selection of materials (plastics, metals, metal-alloys, crystalline materials, fiberglass, etc., or some combination thereof). The ring-shaped internal wireframe is reinforced with three upper wireframe beams 902 and three lower wireframe beams 903. Using such wireframes, the apparatus can more easily meet weight and structural integrity requirements. In addition, wireframe beams are more space efficient than more conventional beams (such as those of FIG. 7). Wireframes can be adapted to house communications or surveillance equipment 904. Alternatively, the frame can be co-opted, and serve as a portion of e.g., an RF antenna for a communications system.

The dark coloration of the rings, airfoils, and frame in the embodiment of FIG. 9 arises from the fact that they are made from (and/or coated in) a material that is impedance matched to the upper atmosphere to lower the radar signature (RCS) of the apparatus. A number of non-radar reflective or radar absorptive materials could suit this purpose (e.g. ferromagnetic materials or nanoparticle coatings). Furthermore, in some embodiments, the curved features of the VSTOL apparatus are flattened into polygonal approximations to reduce diffuse reflections off of the device. Thus, radiation is less likely to be reflected back in its direction of origin. Moreover, surfaces which would tend to reflect incident radar back to its source or other receiver can be angled or shaped so as to minimize such reflections. For instance, the flat or vertical outer surfaces of the rotating rings can be approximated by two oblique intersecting angled surfaces, as can the outward edge of each of the airfoils. In that radar is most likely to impinge in the craft from the side (or somewhat below and to the side when the aircraft is at altitude), these surfaces become most critical.

A wide variety of body styles and purposes would be immediately obvious to one of ordinary skill in the art given the contents of the present disclosure.

Figure 10:
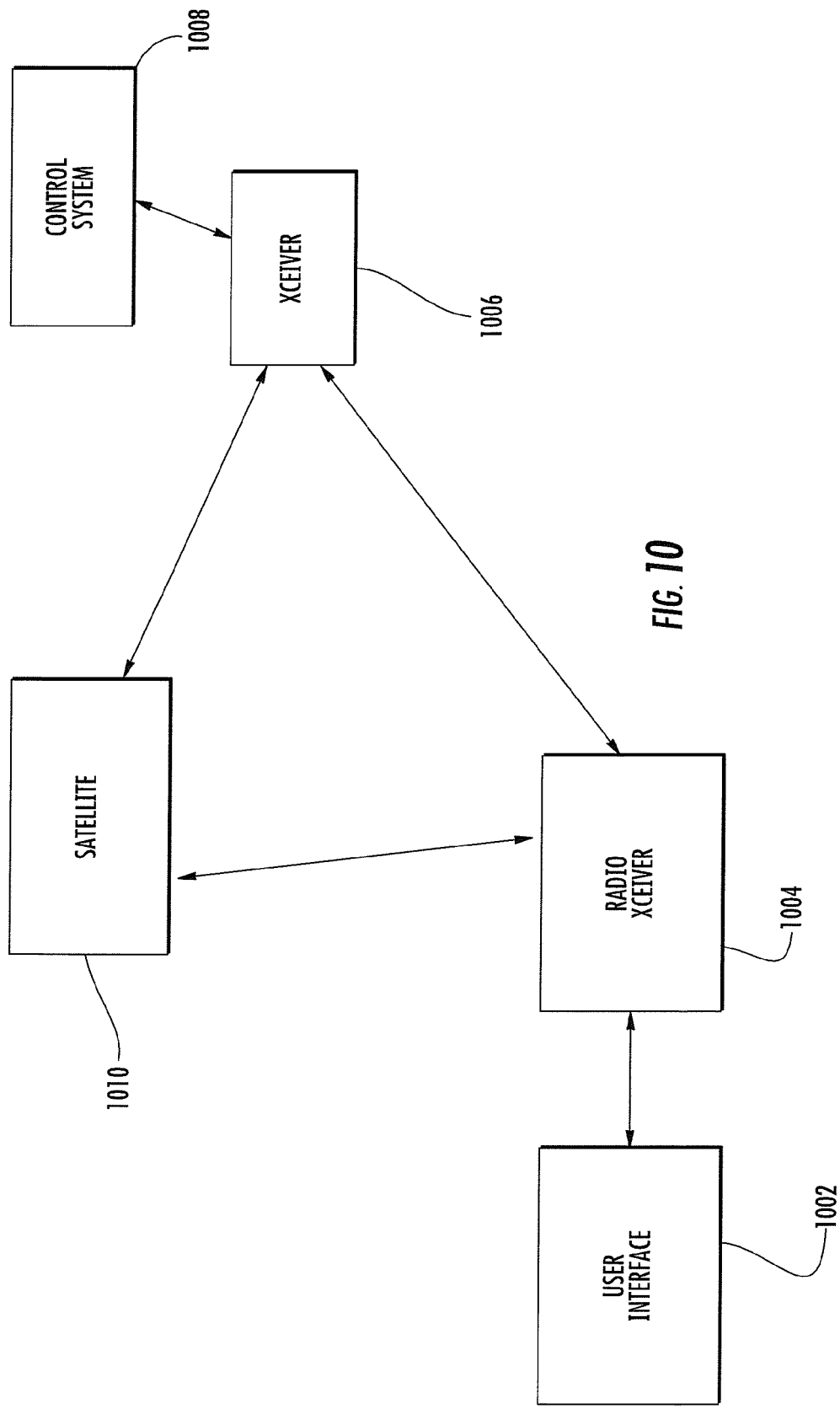
FIG. 10 is a functional block diagram illustrating one embodiment of a control architecture for the VSTOL apparatus.

Referring now to FIG. 10, a second apparatus for the remote operation of the VSTOL apparatus is necessary is some implementations.

In the illustrated embodiment, the Control Equipment (CE) comprises a wireless transceiver 1004 connected to a user interface 1002, the latter receiving operator (or computer, as described in greater detail below) inputs for control of the device. The transceiver then relays commands from the interface to a transceiver 1006 located on the VSTOL apparatus, which is in communication with an on-board controller 1008. The wireless link may be direct (e.g., LOS or curved propagation via the earth's atmosphere), or alternatively indirect such as via one or more relay entities (e.g., land-based tower(s), not shown, or satellite 1010).

It is also envisaged that forward link and/or reverse link data could be transmitted via extant wireless infrastructure; e.g., via a cellular base station or femtocell (e.g., eNodeB), Wi-Fi hotspot, WiMAX transceiver, etc., such that the VSTOL apparatus could be operated remotely over an existing network such as the Internet.

For a human operated interface, one or more joysticks can be used to input commands. Joysticks would offer a degree of familiarity that might help operators of other aircraft acclimate to controlling the VSTOL apparatus. To that end, the interface can also be constructed to simulate a cockpit. In one variant, a user interface and control system similar to that used in the extant Predator and Global Hawk systems is used, so as to permit easy migration between operators/platforms, reduce inventory requirements, etc.

For other potential operators, an interface that comprises a control device made to simulate a videogame console controller (e.g. those used with Xbox 360, PlayStation 3, Nintendo Wii) might offer a similarly familiar experience.

Accordingly, offering an option among multiple interface designs allows for a selection of operators from a larger set of backgrounds, and thus a larger talent pool.

Another important element of the CE is a display. The display shows video or other sensor data from "environmental" sensors located on the VSTOL apparatus, which may include for example electro-optic imagers (e.g., CMOS or CCD), IR imagers such as FLIR, electromagnetic sensors, radiation sensors (e.g., ionizing radiation such as neutron, beta or gamma radiation), etc. Additionally, sensors relating to the control of VSTOL apparatus itself (e.g., pitch, yaw, roll, airfoil angle of attack, ring RPM, airspeed, altitude, etc.) may feed data back to the remote CE so as to provide the operator information necessary to pilot the craft. This allows the remote operator to both control the VSTOL aircraft and react to the environment surrounding it, even if the operator is not in direct visual contact with the VSTOL apparatus, which is typically the case.

It can be appreciated that such a display could use a "heads-up" format to facilitate the display of sensor data and video simultaneously.

In another configuration, the remote human operator could be replaced with a CE that further comprises a processing entity running a computer application configured to operate the VSTOL apparatus autonomously. Locating the processing system for VSTOL apparatus at a remote site has multiple advantages. First, the weight associated with the processing system would not encumber the VSTOL apparatus. Moreover, the processing system would not be exposed to the risk or harsh conditions that might be associated with the location of the VSTOL apparatus. Thus, the processing system and any data stored thereon would not be lost should the VSTOL apparatus be destroyed or become inoperable. Conversely, locating such processing systems remote to the apparatus introduces an inherent latency between the VSTOL apparatus and the processing system.

It will be appreciated from the foregoing that multiple control system architectures may be employed consistent with the disclosure, including (without limitation):

1) remote human operator receiving environmental and control sensor data back from the craft via the wireless link;
2) remote human operator receiving environmental data from the craft, while the craft utilizes autonomous (on board) computer control for operation;
3) remote human operator receiving environmental data from the craft, while the craft utilizes remote (whether co-located with the operator, or otherwise) computer control for operation, the control commands being linked back to the craft via the wireless interface;
4) remote human operator receiving control data from the craft, while the craft utilizes autonomous (on board) computer control for environmental sensors;
5) remote computer operator receiving environmental data from the craft, while the craft utilizes autonomous (on board) computer control for operation; or
6) remote computer operator receiving environmental and control data from the craft for control of the craft's operation and environmental sensors.

Yet other combinations or variations on the foregoing will be appreciated by those of ordinary skill given the present disclosure.

The VSTOL can also be operated completely autonomously. In an exemplary embodiment, an on-board processing entity (e.g., controller 1008 of FIG. 10) runs a computer program configured to evaluate data supplied by on-board navigation equipment and sensors. The processing entity uses this data to guide the device along a preplanned flight path; e.g., using GPS or other fixes as "waypoints" for the flight path. In another variant, terrain contour data from e.g., a radio or laser altimeter is used and matched to a preloaded digital terrain map against which the craft registers to maintain its desired flight path.

It can be envisioned that the processing entity can make determinations to deviate from the planned flight path based on external events. For example, the apparatus can alter its path to continue to follow a tracked target or evade a countermeasure or missile. Alternatively, the apparatus can operate semi-autonomously with periodic command updates being sent from a remote CE or on-board computer.

Method of Operation—

In operation, the VSTOL apparatus generates lift by counter-rotating the rings and thereby allowing for continuous movement of the airfoils. Through inter alia the Bernoulli Principle, lift is generated.

In one embodiment, the curved shape of the airfoils provides the primary mechanism for lift generation. When the airfoils move through a gas, the gas flows at different speeds over the top and bottom of the airfoil. Specifically, the curvature is such that a gas moving over the top of the foil moves faster than that moving under the airfoil. The faster moving gas is at a lower pressure than the slower moving gas. This pressure imbalance leads to an upward force on the airfoil. Hence, lift is generated. It can also be appreciated that the leading and trailing edges of the airfoils in the illustrated embodiment may be shaped using a tear drop model to reduce eddy currents and turbulent flow as the airfoil moves through the gaseous medium.

However, to generate constant lift, the airfoil must move in the appropriate direction through the gaseous medium continuously. For situations in which hovering or vertical lift is desired, rotary motion can provide the continuous movement. However, to generate the torque needed to maintain the rotary motion, an equal and opposite torque must also be generated. As previously mentioned, conventional rotary wing aircraft use an orthogonally oriented rotor (e.g., tail rotor on a helicopter) to provide counter rotation force. However, in such aircraft the motion of the second rotor does not contribute to the generation of lift. Therefore, such a system would have reduced efficiency.

However, the VSTOL apparatus uses rings with attached airfoils that can be contra-rotated at the same speed such that no net torque is produced by the rings. Thus, both rotors contribute to lift generation and apparatus orientation stability. This increases the lift capability of the VSTOL apparatus and conversely its efficiency. Additionally, if different torques are applied to the rotors, the apparatus can be quickly and efficiently reoriented without a reduction in lift capacity. Notwithstanding, the VSTOL apparatus can be made to rotate around its central (vertical) axis by intentionally imparting the aforementioned torque; e.g., by rotating one ring faster than the other, adjusting the pitch of one ring's airfoils relative to the other, etc.

Figure 11:
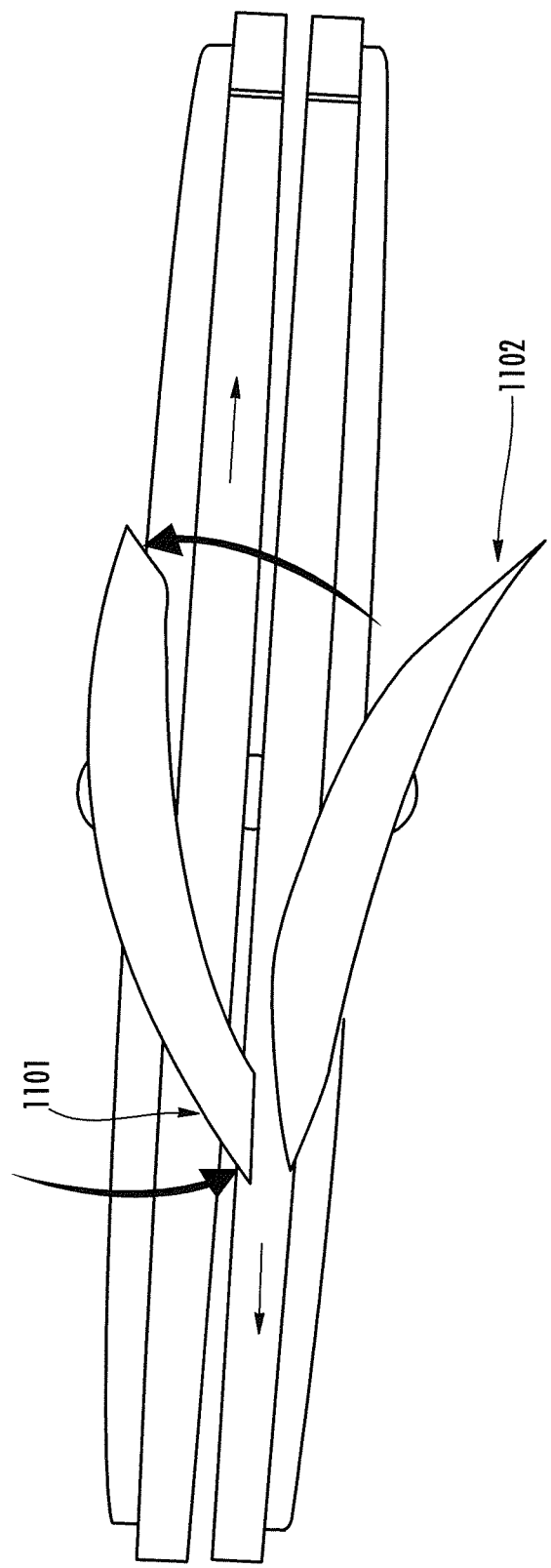
FIG. 11 is a side elevation view of one exemplary embodiment of the VSTOL apparatus, showing coordination of the airfoils to generate high-pitch lift.
Figure 12:
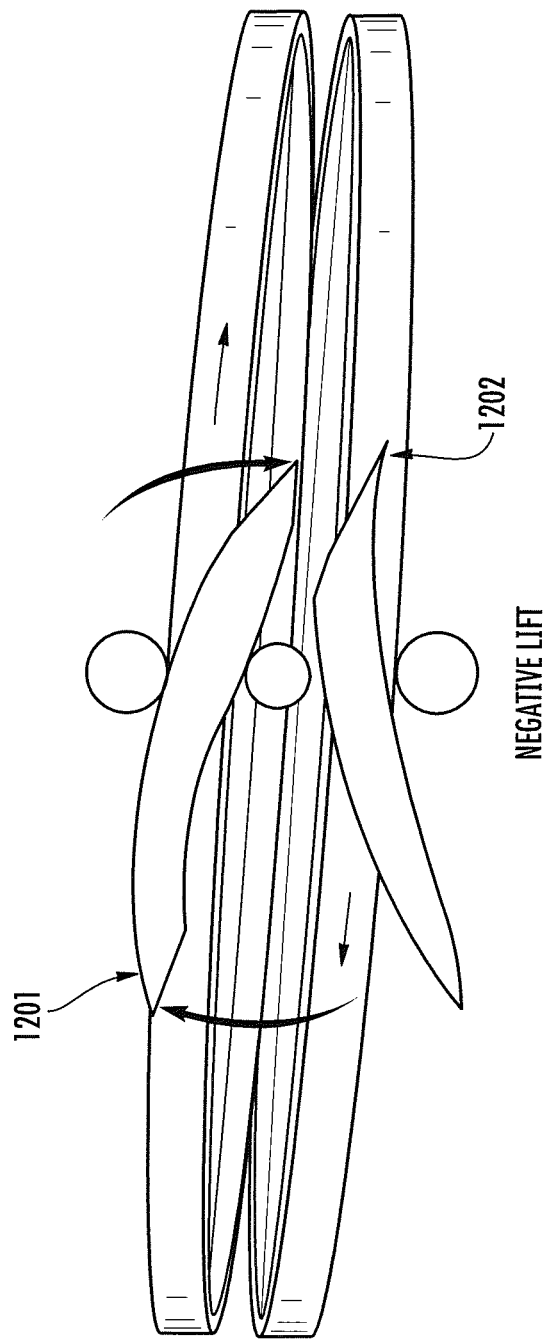
FIG. 12 is a side elevation view of the exemplary embodiment of the VSTOL apparatus, showing coordination of the airfoils to generate negative lift.

The apparatus can also be steered through the combined articulation of the upper and lower airfoils. Referring now to the side view shown in FIG. 11, the tail of the upper airfoil is place in the fully lowered position 1101, and the tail of the lower airfoil is in the fully raised position 1102. This configuration produces "high-pitch lift." Conversely, as shown in the side view of FIG. 12, the tail of the upper air foil is in the raised position 1201 and the tail of the lower airfoil is in the fully lowered position 1202. This configuration produces "negative lift."

The VSTOL apparatus can generate horizontal motion by tilting its orientation with respect to the horizon. Thus, a portion of the force that would generate lift if the device were not tilted with respect to the horizon now generates horizontal motion. This tilting can be achieved in various ways. The apparatus can vary its center of mass by shifting mechanical parts or the contents of the fuselage; e.g., a normally centered mass can be moved, such as via electric motor, to a position off-center such that the aircraft will tilt downward toward that direction. In cases where the aircraft is powered by fossil or other fuels, the distribution of the liquid fuel can be varied (e.g., pumped or allowed to migrate), such as through use of a network of smaller, segregated fuel cells, so as to alter the weight distribution of the aircraft as desired. The apparatus can also vary the lift generated by the airfoils at different positions. This can be achieved through the use of flaps or by altering the orientation, length, or even shape of the airfoils as previously described.

A key advantage of the VSTOL apparatus is that is can also be operated in such that it utilizes air currents to generate lift. This leads to improved performance in both the duration that the apparatus can be deployed and the range over which it can operate. The disc shape of the rings and fuselage aide in overall glide and lift. Therefore, this VSTOL apparatus design is particularly well suited for operation based solely on air currents.

Lift is also generated in certain conditions by impingement of moving air against the upward or downward tilted airfoil exposed surface. This feature is particularly useful when the apparatus is in "loiter" mode, wherein the rings (and airfoils) are minimally rotating or not rotating, and the VSTOL apparatus is in effect acting somewhat like a kite. In such loiter mode, the operator (or onboard/remote computer controller) acts to maintain the attitude of the aircraft at a prescribed angle of attack relative to the prevailing winds, so as to generate sufficient lift to maintain the craft's altitude.

For extremely long-term operation, the motors/drive system driving the rings (and in some cases even articulating the airfoils) are turned off, and the VSTOL apparatus fully depends on air currents for lift and balance. However, with little more energy usage the pitch, extension, and expansion of the airfoils (as well as the position of aforementioned "centered" mass) can be adjusted to control the lift and balance of the VSTOL apparatus. This increases the flexibility of this operational mode.

Finally, the motors driving the rings can be placed in a low power consumption mode to further assist the ambient air currents in the generation of lift. Running the rotors would still lead to significant fuel consumption. However, in an adjustable low power consumption mode, a wide range of air current speeds can be used to assist in the generation of lift. In this fashion, effective use of power and fuel economy can be achieved.

Hovering capabilities and low turning radii allow for operation of the VSTOL apparatus in a crowded airspace, or one with hostile countermeasures or munitions. For example, operation at low altitude in an urban environment will present numerous obstacles (buildings and power lines etc.). To avoid these obstacles, traditional fixed wing aircraft would have to travel too slowly to generate sufficient lift and still negotiate around these obstacles. Thus, the VSTOL apparatus is well suited for surveillance or tracking missions through such airspace. Similarly, when over hostile territory, the craft can readily "viff" (a maneuver utilized by e.g., Harrier VSTOL pilots to rapidly slow or accelerate sideways/upwards/downwards using vectored thrust nozzles) so as to avoid an incoming missile, projectiles, other aircraft, etc. This can be accomplished by, in one variant, rapidly shifting its center of mass to the desired side, or alternatively rapidly changing the pitch of the airfoils on one or both rings so as to rapidly change altitude.

Alternate Configurations

Figure 13:
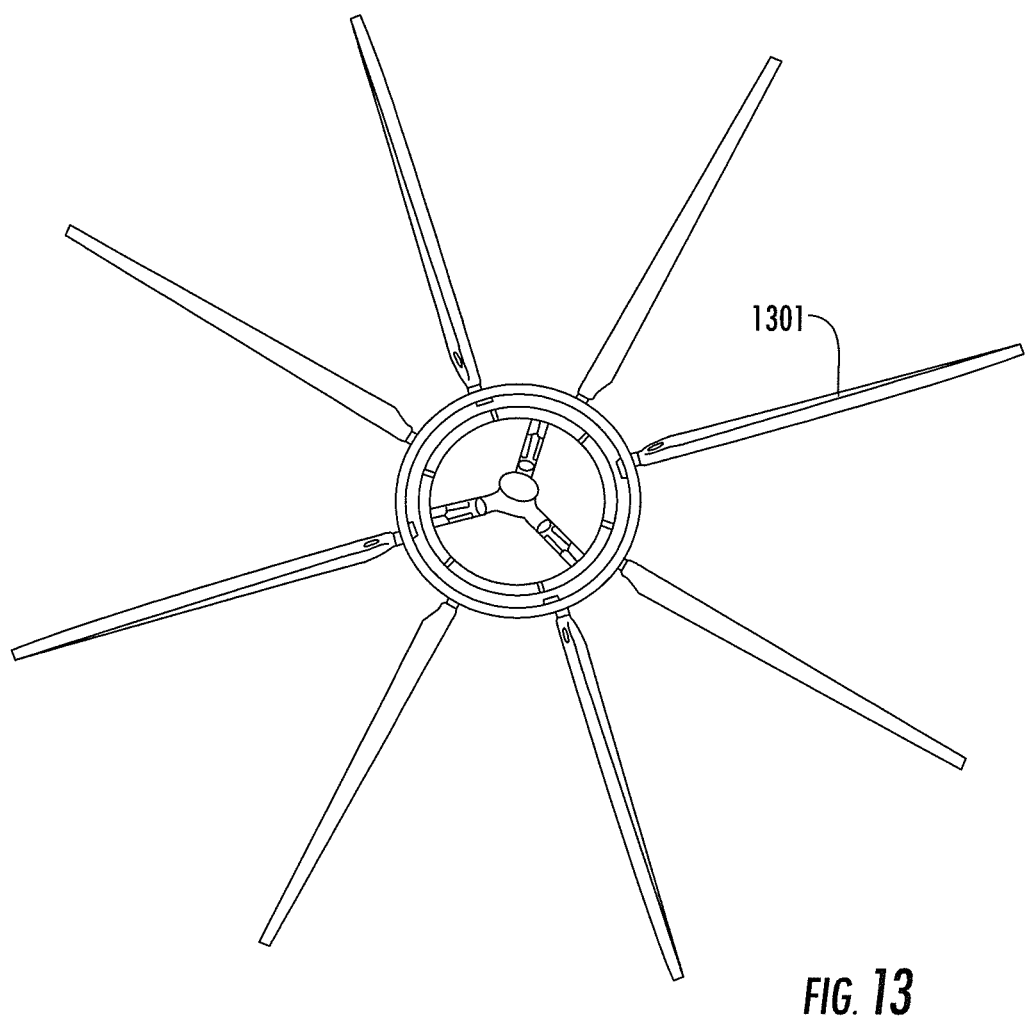
FIG. 13 is a top view of an alternative embodiment of the VSTOL apparatus, showing long, thin (diameter) airfoils.

Referring now to FIG. 13, in another configuration, longer and narrower airfoils 1301 are used in place of the shorter airfoils shown previously. The airfoils of FIG. 13 are more similar to the blades seen on helicopters or wind farm generating apparatus. As previously noted, the number and shape of the airfoils can be changed to suit the requirements of specific applications. For example, applications requiring longer deployments of the apparatus might use longer, thinner airfoils (such as those of FIG. 13) and/or in greater numbers to increase the power efficiency of the apparatus. This is similar to airfoil designs on gliders, extreme endurance aircraft, and human-powered airplanes, which use longer, thinner wings than powered-flight aircraft.

It will further be appreciated that the illustrated airfoils (whether in this embodiment or others) may include an intrinsic pitch; e.g., as a function of radial position or length. For instance, akin to a propeller on a conventional propeller-driven aircraft, the airfoils may be somewhat "twisted" or progressively curved so as to achieve desirable aerodynamic properties such as lift, vortex suppression, greater efficiency, etc. This pitch is separate from that which is imparted by actual motion (rotation) of the airfoil about its point of attachment as previously described herein with respect to, inter alia, FIG. 3.

Figure 14:
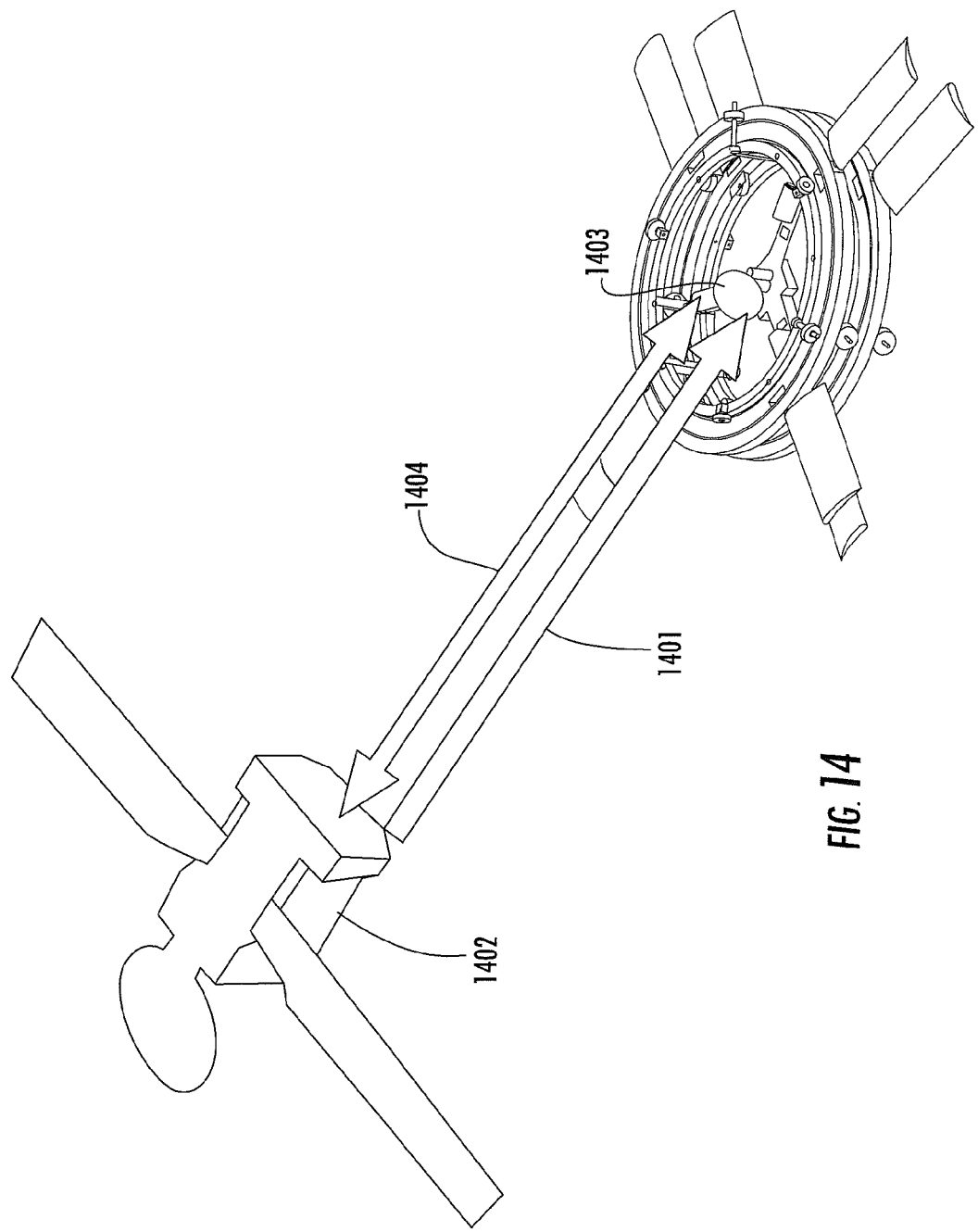
FIG. 14 is perspective view of one embodiment of the VSTOL apparatus, showing wireless power and two-way data communication via satellite.

Referring now to FIG. 14, in some configurations, the VSTOL apparatus is powered via satellite downlink 1401. The satellite 1402 provides a directed electromagnetic energy (e.g., microwave) beam, which could comprise a laser, maser, x-ray laser, or any other directed radiation beam, to a parabolic dish 1403 (or other rectifying antenna) located on the VSTOL apparatus. In addition, a two-way communications uplink/downlink 1404 could be provided on the same or another band to facilitate data transfer from the VSTOL device to the same or different orbital vehicle. The VSTOL apparatus may also include indigenous or remote dish steering capability so as to maintain the dish 1403 locked onto the satellite beam.

It will also be appreciated that while a parabolic-type dish 1403 is illustrated in the embodiment of FIG. 14, appreciable amounts of electromagnetic energy may also be transferred to the craft via a distributed array, such as e.g., a phased array of the type well know in the art. In such an implementation, an array of antennas may be used to receive microwave band (or other) electromagnetic energy and convert the incident electricity to electrical power. Similar, high efficiency solar or photovoltaic cells may conceivably used, especially where the craft will be operating in very sunny climates (e.g., over deserts) and includes an energy storage means.

Figure 15:
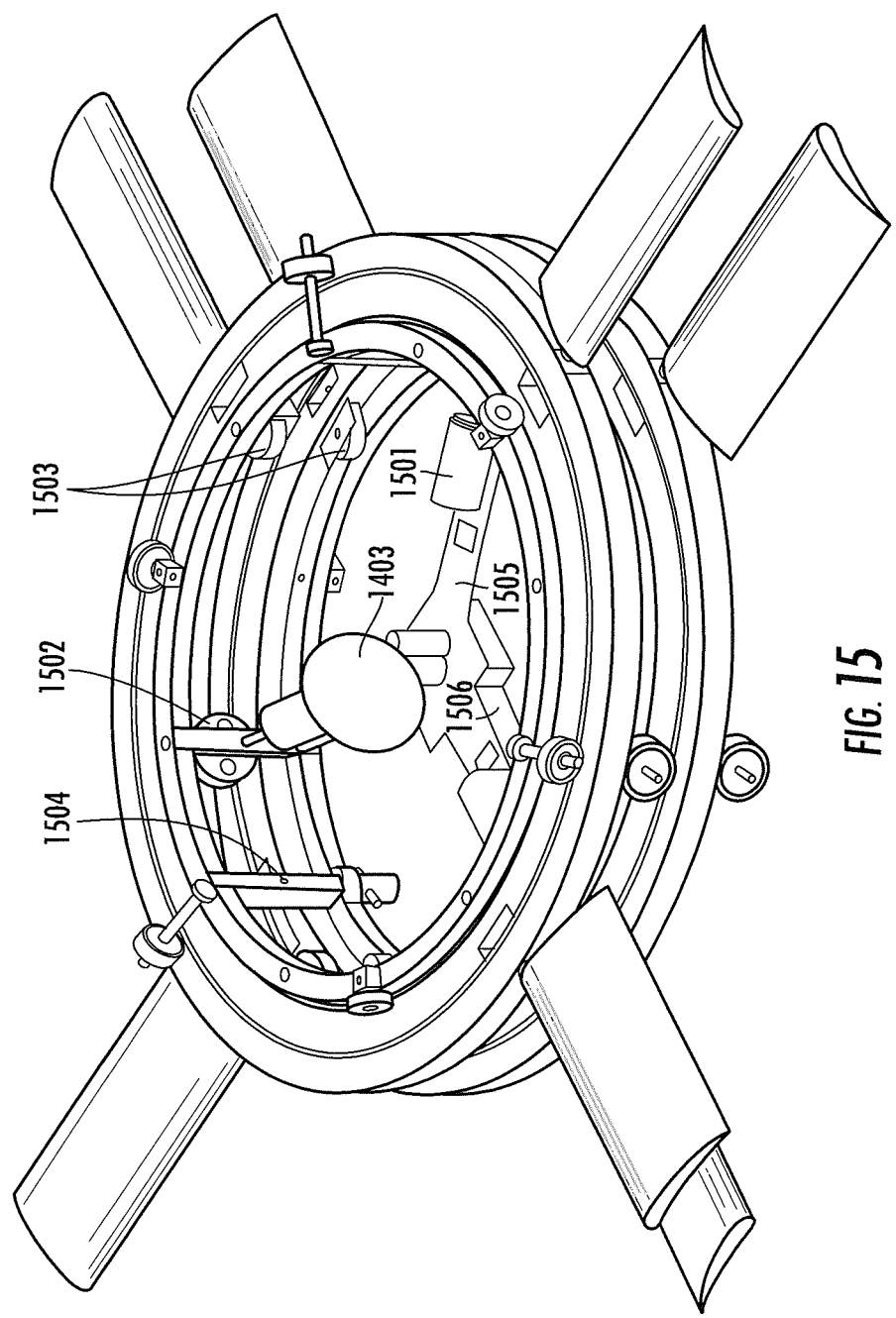
FIG. 15 is a perspective view of still another alternative embodiment of a VSTOL apparatus in accordance with the principles of the present disclosure.
Figure 15A:
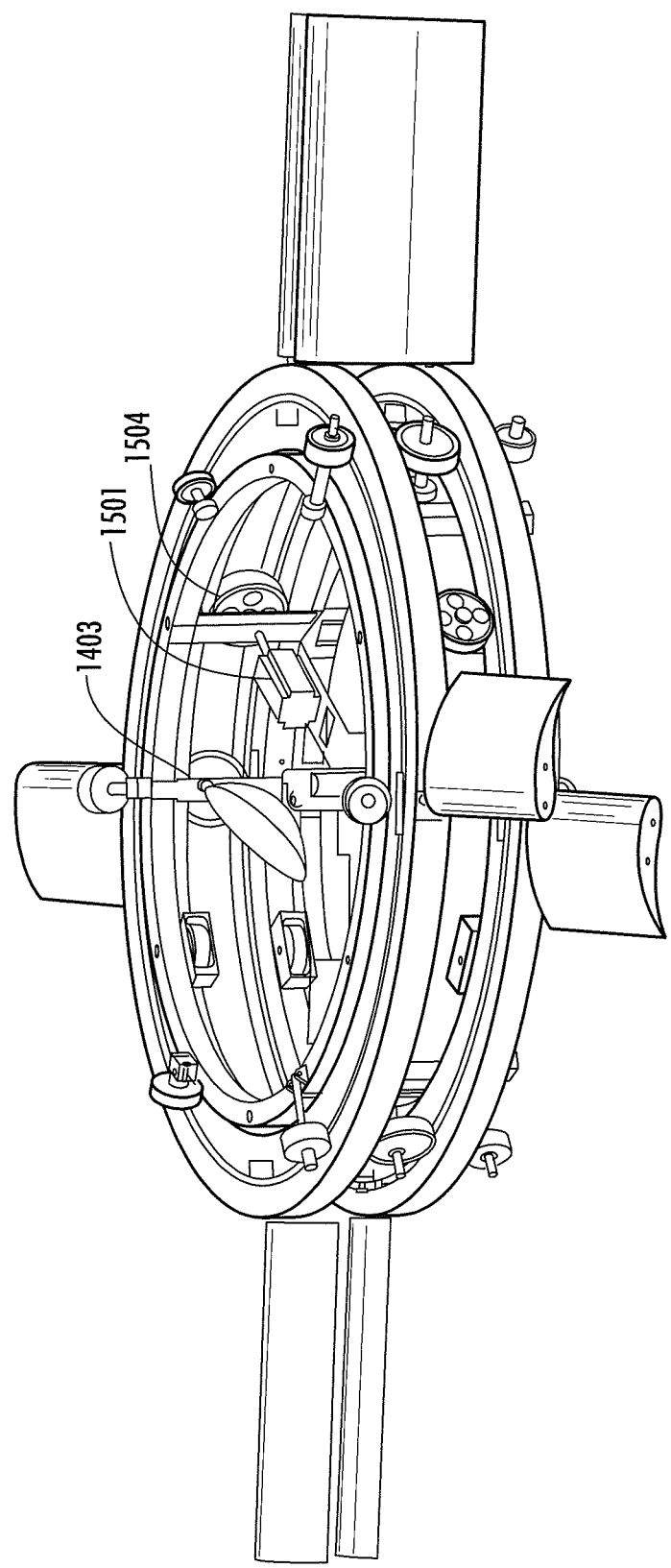
FIG. 15a is top perspective view of the embodiment of the VSTOL apparatus shown in FIG. 15.
Figure 15B:
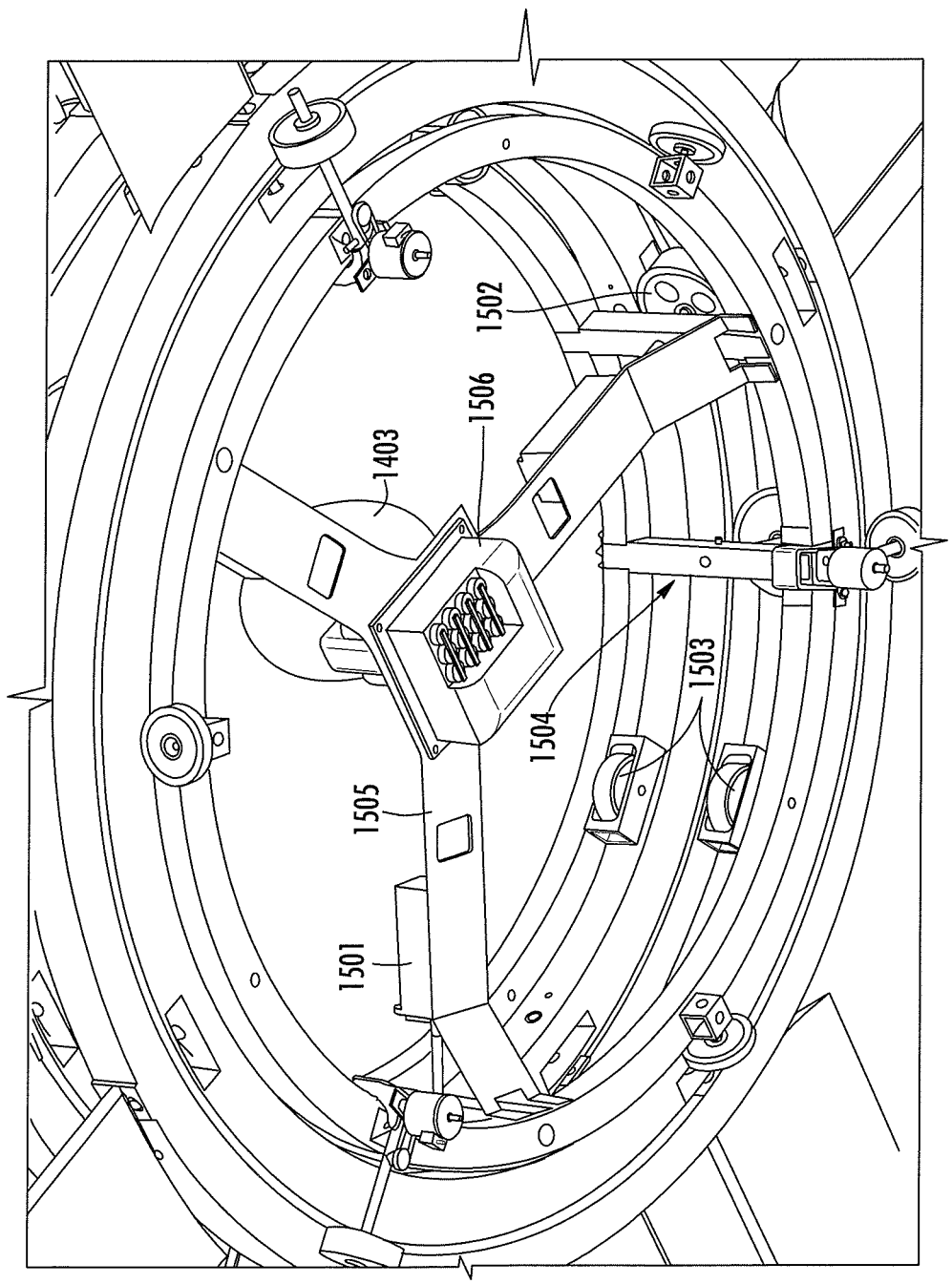
FIG. 15b is a bottom perspective view of the embodiment of the VSTOL apparatus shown in FIG. 15.

Referring now to FIG. 15, FIG. 15a, and FIG. 15b, another exemplary embodiment of the VSTOL apparatus is shown in a top, side, and bottom perspective views, respectively. In this embodiment, three drive motors 1501 run three accompanying main drive wheels 1502. These drive wheels provide the torque necessary to rotate the rings with the plurality of attached airfoils. The three drive wheels are assisted by flat drive wheels 1503, which are oriented perpendicular to the main drive wheels. The use of two sets of wheels increases the maximum torque that can be imparted to the rotating rings. In addition, the perpendicular orientation of the wheel sets helps to ensure the rings rotate about the optimal axis.

The Figures also shows one embodiment of the complete airfoil articulation assembly 1504. In this embodiment, a tripod support 1505 is attached to the fuselage support frame 202. The tripod support holds the drive motors 1501, a satellite dish 1403, and a battery pack 1506 that stores energy and powers the entire apparatus.

Figure 16:
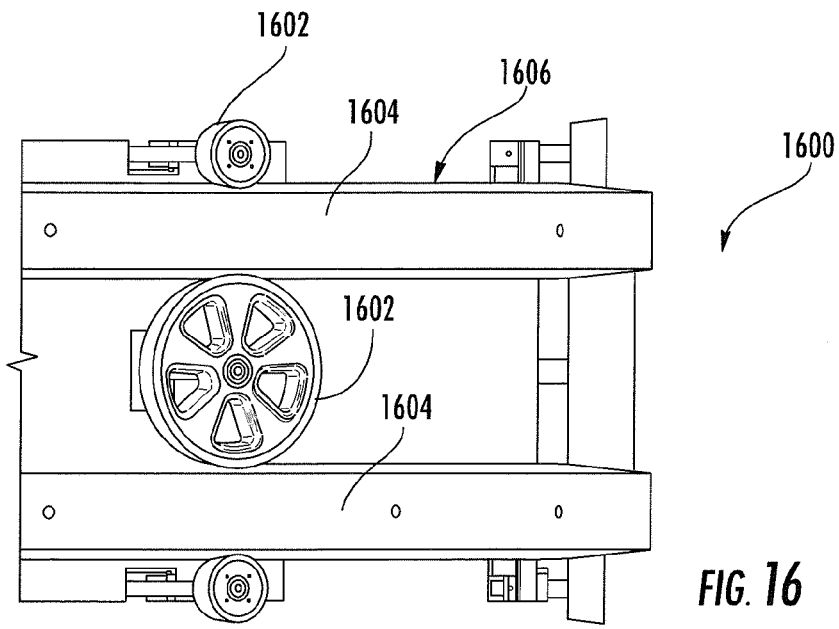
FIG. 16 is a perspective view of yet another embodiment of the VSTOL apparatus.

Referring now to FIG. 16, another exemplary embodiment of the VSTOL apparatus is shown. In this embodiment, the wheels 1602 and power rings 1604 include slanted planes 1606 to increase contact between the wheel and rings. The higher diameter outer portion of the wheel will undergo the same number of rotations 1608 as the lower diameter inner portion of the wheel as it travels along the power ring. The slanted wheel design allows for tailored contact levels with the power ring. For example, in some implementations a bull nose or curved cross-section wheel makes contact with the power ring at a single point. For some high-torque scenarios the bull nose wheel 'spins out' rather than imparting more torque on the power ring. Thus, using the slant and curvature between the wheels and the power rings as a free design parameter allows for the friction/drag levels in to be referenced to the torque requirements of the system, whether statically or dynamically. As to the latter, the present disclosure contemplates that for instance the shape or configuration of the cross-section of the wheel can be altered dynamically (e.g., via internal control mechanisms), such that greater or lesser contact area is achieved. In low-torque situations, lesser contact may be desirable so as to, inter alia, maximize efficiency/mitigate frictional losses.

Figure 16A:
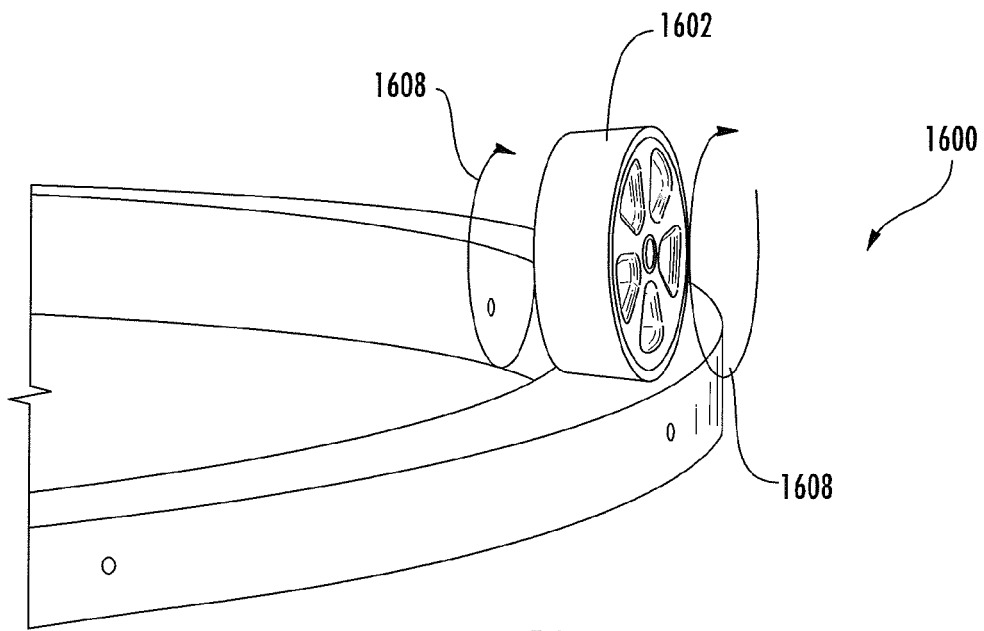
FIG. 16a is another perspective view of the embodiment of the VSTOL apparatus shown in FIG. 16.
Figure 17:
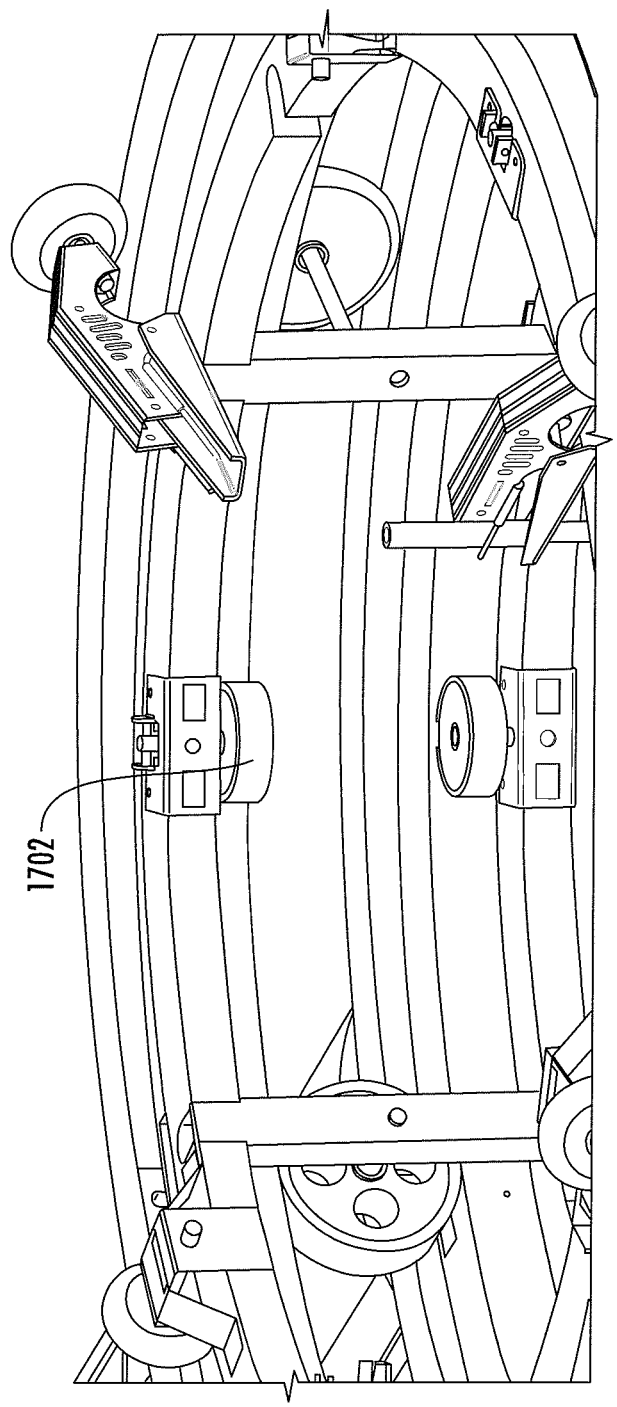
FIG. 17 is a perspective view of one embodiment of the VSTOL apparatus showing the use of inline riders.
Figure 18:
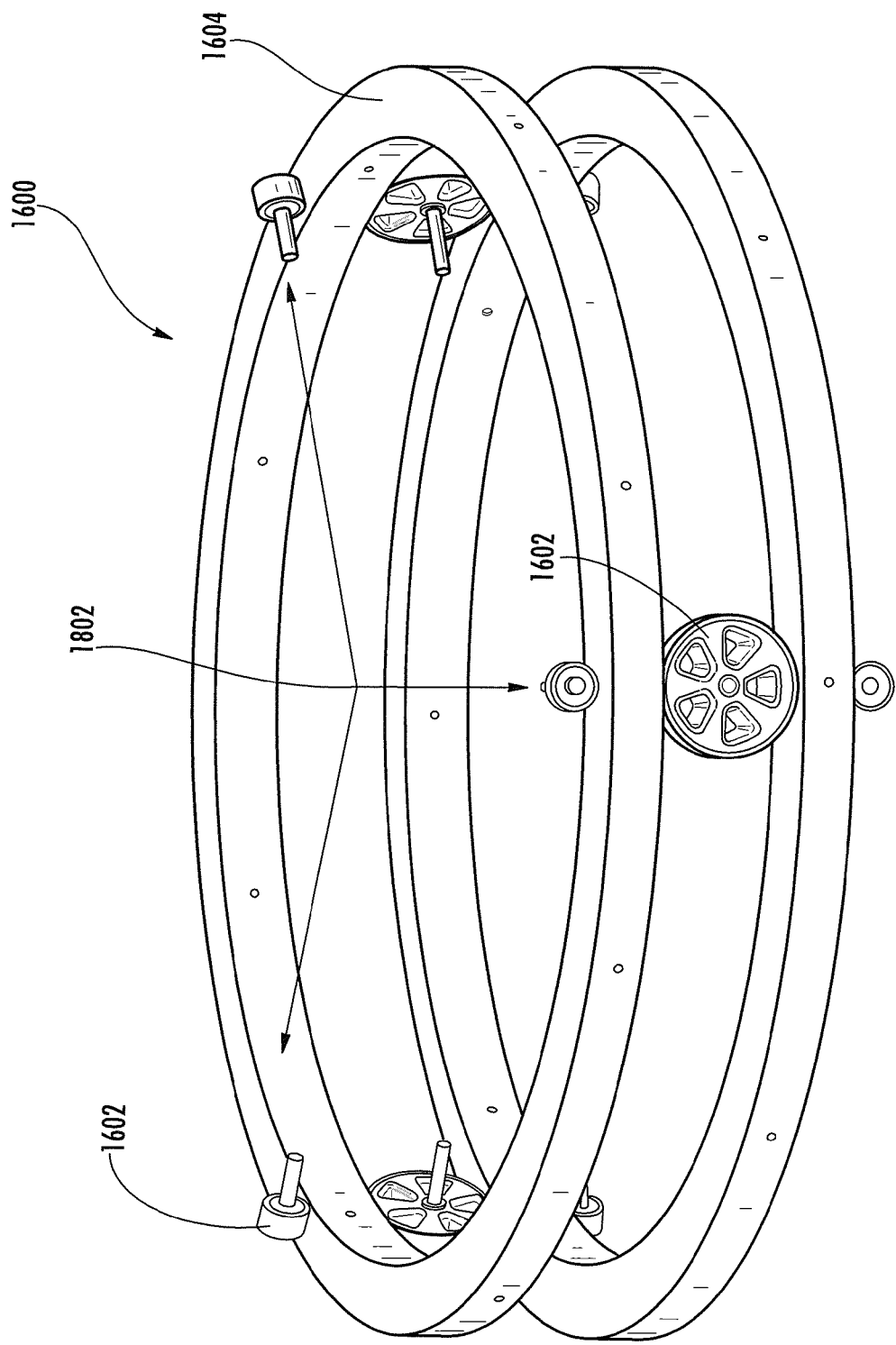
FIG. 18 is a perspective view of the embodiment of the VSTOL apparatus shown in FIG. 16 detailing the restoring forces generated by the shaped wheels and rings.

In addition, shaping (e.g. slants, grooves, curves, etc.) of the wheels and power rings may be used to maintain alignment between them. Referring now to FIG. 17, a flat power ring exemplary embodiment 1700 is shown, the alignment of the system is maintained by inline riders 1702. Tension is applied to the ring by the inline riders to maintain the alignment of the ring. However, the inline riders may serve as a source of drag. Because the shaped wheels and rings contribute to maintaining the system alignment, the reliance on the inline riders may be reduced. In some shaped embodiments, the total drag in the system is lower than that of the flat wheel system because of the reduced drag contribution from the inline riders. The shaped wheel/power ring pairings may include slanted planes 1606 as shown in FIGS. 16 and 16a. Referring to the exemplary embodiment 1600 shown from a perspective view in FIG. 18, the restoring forces 1802 generated by the slanted wheels 1604 and rings 1604 keeps the power ring in alignment. However, the VSTOL system is no way limited to these slanted wheel/ring embodiments. One or more series of grooves generating a (quasi)-sinusoidal pattern may be used. Similarly, sawtooth or square groove patterns may be implemented. Further, rails may be used to provide both alignment stability and friction for the drive wheels. Small-scale maglev technology (e.g. rare-earth based) may also be used to maintain alignment on a rail or groove while providing virtually no drag component.

Figure 19:
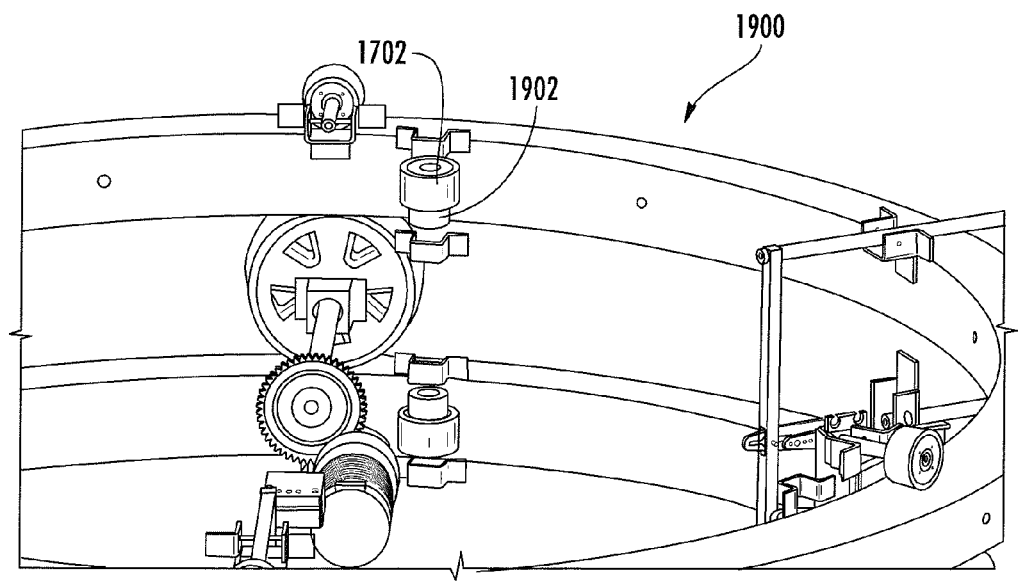
FIG. 19 is a perspective view of another embodiment of the VSTOL apparatus in accordance with the principles of the present disclosure.
Figure 19A:
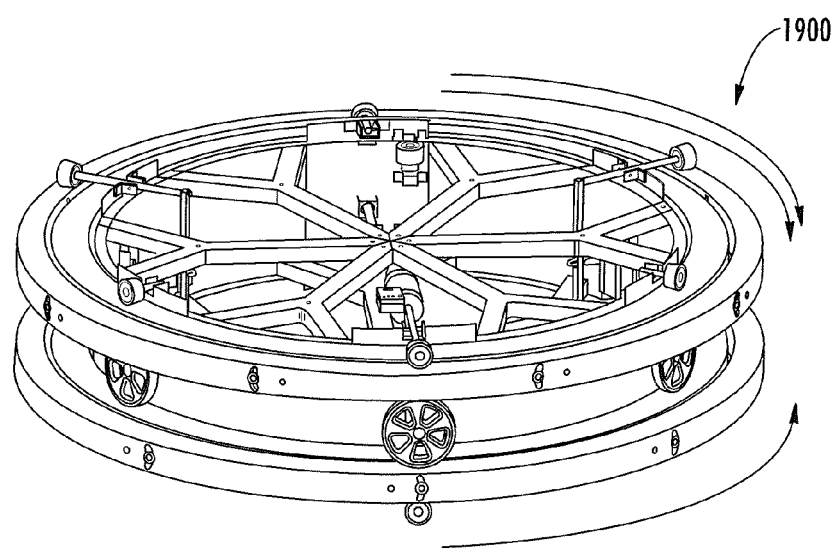
FIG. 19a is another perspective view of the embodiment of the VSTOL apparatus shown in FIG. 19 detailing a means of reorienting the VSTOL apparatus.

Referring now to FIG. 19, in a further exemplary embodiment 1900, brakes 1902 are added to the individual inline riders 1702. These brakes may be operated independently to generate increased drag at a specific location on the VSTOL apparatus. This causes the power ring rotation to slow in reference to the main fuselage. The overall effect is to turn the fuselage in the direction of rotation of the ring to which the brake was applied. For example, in a system with two counter rotating power rings both turning at 300 rpm, a brake is applied to the upper ring slowing it to 200 rpm. Via conservation of angular momentum, it is known that the fuselage will begin to rotate in the direction of the upper ring rotation. When the fuselage achieves the desired orientation, a brake may be applied to the lower ring slowing it to 200 rpm. This causes the fuselage to stop rotating. This process is shown in FIG. 19a. Similarly, this turning may be achieved through driving the rings in addition to braking. From a 300 rpm start, the VSTOL may speed the upper ring to 35 rpm (resulting in a turn in the direction opposite the rotation of the upper ring) and then drive the bottom ring to 350 rpm to stop. Combinations of driving and braking may also allow turning. For example, the VSTOL may brake (drive) one ring to initiate a turn of the fuselage and then drive (brake) the same ring to cease turning. In some cases, constant rebalancing (e.g. by computer or manually) of momentum among the counter propagating rings may be used to maintain orientation of the fuselage. This may be applied to counter constant small losses of momentum in the VSTOL apparatus due to friction/drag.

It will be recognized that while certain aspects of the disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated of carrying out the principles and architectures described herein. This description is in no way meant to be limiting, but rather should be taken as illustrative of the general principles of the disclosure. The scope of the invention should be determined with reference to the claims.

What is claimed is:

1. A vertical short takeoff and landing (VSTOL) apparatus, comprising:
   two or more power rings each having a plurality of airfoils attached thereto via respective first connection elements;
   an articulation system comprising:
      two or more control rings each having the plurality of airfoils attached thereto via respective second connection elements, the two or more control rings each configured to rotate with respective ones of the two or more power rings;
      the first connection elements configured to be received within respective apertures contained within each of the two or more control rings; and
      an articulation apparatus configured to raise or depress at least a portion of the two or more control rings with respect to the two or more power rings thereby articulating at least one of the plurality of airfoils;
   one or more motors, the one or more motors configured to rotate the two or more power rings in a substantially counter-rotating fashion; and
   one or more power sources, the one or more power sources configured to provide power to the one or more motors.

2. The VSTOL apparatus of claim 1, wherein each of the plurality of airfoils are configured to articulate between two or more positions using at least one of the two or more control rings.

3. The VSTOL apparatus of claim 2, wherein each of the plurality of airfoils is further configured to be articulated independently of others of the plurality of airfoils.

4. The VSTOL apparatus of claim 1, further comprising a fuselage.

5. The VSTOL apparatus of claim 4, wherein the fuselage is configured to house a plurality of sensory equipment.

6. The VSTOL apparatus of claim 4, wherein the fuselage is configured to house one or more personnel.

7. The VSTOL apparatus of claim 4, wherein the fuselage is configured to house a transceiver apparatus.

8. The VSTOL apparatus of claim 7, wherein the VSTOL apparatus is configured to be remotely operated via at least the transceiver apparatus.

9. A lift generation system comprising:
   a pair of rotatable power rings;
   a plurality of airfoils disposed on the pair of rotatable power rings and attached thereto via respective first connection elements;
   a pair of control rings that are each disposed external to respective ones of the pair of rotatable power rings, the pair of control rings each being configured to rotate with respective ones of the pair of rotatable power rings;
   a drive apparatus coupled to an energy source and configured to contra-rotate each of the rotatable power rings of the pair of rotatable power rings; and
   an articulation system, comprising:
      a plurality of second connection elements, each of the second connection elements coupled between a respective airfoil and one of the pair of control rings;
      wherein the first connection elements are configured to be received within respective apertures contained within each of the pair of control rings; and
      an articulation apparatus configured to raise or depress at least a portion of the pair of control rings with respect to the pair of rotatable power rings thereby articulating at least one of the plurality of airfoils;
   wherein the lift generation system is configured to generate lift via airflow around the airfoils during contra-rotation of the rings of the pair.

10. The lift generation system of claim 9, wherein the articulation apparatus further comprises a plurality of actuator devices.

11. The lift generation system of claim 10, wherein the generated lift is facilitated by coordination action among the plurality of actuator devices.

12. The lift generation system of claim 9, wherein the energy source comprises a battery, and the drive apparatus comprises an electric motor.

13. The lift generation system of claim 9, wherein the energy source comprises a substantially liquid fuel, and the drive apparatus comprises a combustion engine configured to operate on the substantially liquid fuel.

14. The lift generation system of claim 10, wherein the plurality of airfoils are articulated such that their attitude relative to their associated ring can be controllably varied.

15. The lift generation system of claim 14, wherein the controllable variation can be used to provide at least one of (i) a change in lift, and/or (ii) a change in attitude of the system.

16. The VSTOL apparatus of claim 1, wherein at least one of the plurality of airfoils comprises an extensible control surface.

17. The VSTOL apparatus of claim 1, wherein at least one of the plurality of airfoils is substantially deformable in shape via one or more internal mechanisms present within the at least one airfoil.

* * * * *